US012632256B2

(12) United States Patent
Chavan

(10) Patent No.: US 12,632,256 B2
(45) Date of Patent: May 19, 2026

(54) PREFETCH REQUEST GENERATION

(71) Applicant: Arm Limited, Cambridge (GB)

(72) Inventor: Vijay Chavan, Tempe, AZ (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/670,039

(22) Filed: May 21, 2024

(65) Prior Publication Data

US 2025/0362915 A1      Nov. 27, 2025

(51) Int. Cl.
*G06F 9/30*          (2018.01)

(52) U.S. Cl.
CPC ...... *G06F 9/30065* (2013.01); *G06F 9/30047* (2013.01)

(58) Field of Classification Search
CPC ............. G06F 9/30043; G06F 9/30047; G06F 9/30065; G06F 9/325; G06F 9/383; G06F 9/3832; G06F 12/0862
See application file for complete search history.

(56) References Cited

U.S. PATENT DOCUMENTS

| | | | | |
|---|---|---|---|---|
| 5,537,620 A | * | 7/1996 | Breternitz, Jr. ......... | G06F 8/443 |
| | | | | 717/160 |
| 5,704,053 A | * | 12/1997 | Santhanam ............. | G06F 9/383 |
| | | | | 712/E9.047 |
| 6,055,650 A | * | 4/2000 | Christie .................. | G06F 9/384 |
| | | | | 714/39 |
| 6,321,330 B1 | * | 11/2001 | Doshi ..................... | G06F 9/384 |
| | | | | 712/225 |
| 6,574,712 B1 | * | 6/2003 | Kahle ................. | G06F 12/0862 |
| | | | | 712/E9.055 |
| 7,533,242 B1 | * | 5/2009 | Moll .................... | G06F 9/30047 |
| | | | | 711/213 |
| 11,663,007 B2 | | 5/2023 | Grocutt | |
| 2013/0185516 A1 | * | 7/2013 | Sassone .................. | G06F 9/381 |
| | | | | 711/E12.004 |
| 2019/0095209 A1 | * | 3/2019 | Grant ...................... | G06F 9/325 |
| 2019/0310851 A1 | | 10/2019 | Grocutt | |

OTHER PUBLICATIONS

Wikipedia—The Free Encyclopedia, Zero-Overhead Looping, 3 pages., Apr. 16, 2024.

* cited by examiner

*Primary Examiner* — Jyoti Mehta
*Assistant Examiner* — Kasim Alli
(74) *Attorney, Agent, or Firm* — NIXON & VANDERHYE P.C.

(57) ABSTRACT

An apparatus has decoding circuitry to decode instructions defined according to an instruction set architecture (ISA) support a loop control instruction providing an explicit loop presence hint indicating that a sequence of instructions to be executed includes a program loop body to be iterated. Processing circuitry performs data processing in response to the decoded instructions. Prefetch circuitry generates a prefetch request for data to be prefetched into a cache corresponding to an address predicted to be accessed by the processing circuitry in future. In response to determining that the decoding circuitry has detected the loop control instruction, the prefetch circuitry activates generation of at least one loop-control-instruction-triggered stream of prefetch requests specifying addresses predicted based on a property of at least one instruction of the program loop body whose presence is indicated by the loop control instruction.

17 Claims, 13 Drawing Sheets

Zero - overhead Loops

Template 1:
x1

| | | | | | | | | | | | | |
|---|---|---|---|---|---|---|---|---|---|---|---|---|
| Input vector address | 1000 | 1001 | 1002 | 1003 | 1004 | 1005 | 1006 | 1007 | 1008 | 1009 | 1010 | 1011 |
| NN weight Memory Address | 2000 | 2001 | 2002 | 2003 | 2004 | 2005 | 2006 | 2007 | 2008 | 2009 | 2010 | 2011 |
| NN Weights Access Sequence | 2000 | 2001 | 2002 | 2003 | 2004 | 2005 | 2006 | 2007 | 2008 | 2009 | 2010 | 2011 |
| input vector access sequence | 1000 | 1001 | 1002 | 1003 | 1004 | 1005 | 1006 | 1007 | 1008 | 1009 | 1010 | 1011 |

Template 2:
x2 matrix blocking

| | | | | | | | | | | | | |
|---|---|---|---|---|---|---|---|---|---|---|---|---|
| Input vector address | 1000 | 1001 | 1002 | 1003 | 1004 | 1005 | 1006 | 1007 | 1008 | 1009 | 1010 | 1011 |
| NN weight Memory Address | 2000 | 2001 | 2002 | 2003 | 2004 | 2005 | 2006 | 2007 | 2008 | 2009 | 2010 | 2011 |
| (Stream 0) | 2000 | 2001 | 2002 | 2003 | 2004 | 2005 | 2006 | 2007 | 2008 | 2009 | 2010 | 2011 |
| NN Weights Access Sequence | 2000 | 2016 | 2001 | 2017 | 2002 | 2018 | 2003 | 2019 | 2004 | 2020 | 2005 | 2021 |
| input vector access sequence | 1000 | 1001 | 1002 | 1003 | 1004 | 1005 | 1006 | 1007 | 1008 | 1009 | 1010 | 1011 |

Template 3:
x4 matrix blocking

| | | | | | | | | | | | | |
|---|---|---|---|---|---|---|---|---|---|---|---|---|
| Input vector address | 1000 | 1001 | 1002 | 1003 | 1004 | 1005 | 1006 | 1007 | 1008 | 1009 | 1010 | 1011 |
| NN weight Memory Address | 2000 | 2001 | 2002 | 2003 | 2004 | 2005 | 2006 | 2007 | 2008 | 2009 | 2010 | 2011 |
| (Stream 0) | 2000 | 2001 | 2002 | 2003 | 2004 | 2005 | 2006 | 2007 | 2008 | 2009 | 2010 | 2011 |
| NN Weights Access Sequence (Stream 1) | 2000 | 2008 | 2016 | 2024 | 2001 | 2009 | 2017 | 2025 | 2002 | 2010 | 2018 | 2026 |
| input vector access sequence | 1000 | 1001 | 1002 | 1003 | 1004 | 1005 | 1006 | 1007 | 1008 | 1009 | 1010 | 1011 |

| 1027 | 1028 | 1029 | 1030 | 1031 |
|------|------|------|------|------|
| 2027 | 2028 | 2029 | 2030 | 2031 |

| 1027 | 1028 | 1029 | 1030 | 1031 |
|------|------|------|------|------|
| 2027 | 2028 | 2029 | 2030 | 2031 |

Stream 1

| 2027 | 2028 | 2029 | 2030 | 2031 |

| 1027 | 1028 | 1029 | 1030 | 1031 |
|------|------|------|------|------|
| 2027 | 2028 | 2029 | 2030 | 2031 |

Stream 3

| 2027 | 2028 | 2029 | 2030 | 2031 |

PREFETCH REQUEST GENERATION

BACKGROUND

Technical Field

The present technique relates to the field of prefetching.

Technical Background

A processing system may have a prefetcher which generates prefetch requests for requesting that data associated with a given address is prefetched into a cache. The prefetch requests may be generated based on a prediction of addresses which may be specified in future by demand memory access requests generated by processing circuitry in response to execution of load/store instructions.

SUMMARY

At least some examples of the present technique provide an apparatus comprising:

decoding circuitry to decode instructions defined according to an instruction set architecture, the instruction set architecture supporting a loop control instruction providing an explicit loop presence hint indicating that a sequence of instructions to be executed includes a program loop body to be iterated;

processing circuitry to perform data processing in response to the decoded instructions; and prefetch circuitry to generate a prefetch request, the prefetch request comprising a request for data to be prefetched into a cache corresponding to an address predicted to be accessed by the processing circuitry in future; in which:

the prefetch circuitry is configured to:

determine whether the decoding circuitry has detected the loop control instruction in a sequence of decoded instructions; and in response to determining that the decoding circuitry has detected the loop control instruction, activate generation of at least one loop-control-instruction-triggered stream of prefetch requests specifying addresses predicted based on a property of at least one instruction of the program loop body whose presence is indicated by the loop control instruction.

At least some examples of the present technique provide a system comprising:

the apparatus described above, implemented in at least one packaged chip;

at least one system component; and a board, wherein the at least one packaged chip and the at least one system component are assembled on the board.

At least some examples of the present technique provide a chip-containing product comprising the system described above, wherein the system is assembled on a further board with at least one other product component.

At least some examples of the present technique provide a non-transitory computer-readable medium storing computer-readable code for fabrication of an apparatus comprising:

decoding circuitry to decode instructions defined according to an instruction set architecture, the instruction set architecture supporting a loop control instruction providing an explicit loop presence hint indicating that a sequence of instructions to be executed includes a program loop body to be iterated;

processing circuitry to perform data processing in response to the decoded instructions; and prefetch circuitry to generate a prefetch request, the prefetch request comprising a request for data to be prefetched into a cache corresponding to an address predicted to be accessed by the processing circuitry in future; in which:

the prefetch circuitry is configured to:

determine whether the decoding circuitry has detected the loop control instruction; and in response to determining that the decoding circuitry has detected the loop control instruction, activate generation of at least one loop-control-instruction-triggered stream of prefetch requests specifying addresses predicted based on a property of at least one instruction of the program loop body whose presence is indicated by the loop control instruction.

At least some examples of the present technique provide a method comprising:

decoding instructions for execution by processing circuitry according to an instruction set architecture, the instruction set architecture supporting a loop control instruction providing an explicit loop presence hint indicating that a sequence of instructions to be executed includes a program loop body to be iterated;

determining whether the decoding has detected the loop control instruction; and in response to determining that the decoding circuitry has detected the loop control instruction, activating generation of at least one loop-control-instruction-triggered stream of prefetch requests specifying addresses predicted based on a property of at least one instruction of the program loop body whose presence is indicated by the loop control instruction, each prefetch request comprising a request for data to be prefetched into a cache corresponding to an address predicted to be accessed by processing circuitry in future.

Further aspects, features and advantages of the present technique will be apparent from the following description of examples, which is to be read in conjunction with the accompanying drawings.

BRIEF DESCRIPTION OF THE DRAWINGS

FIG. 2 illustrates processing of the zero-overhead loop;

DESCRIPTION OF EXAMPLES

Figure 1:
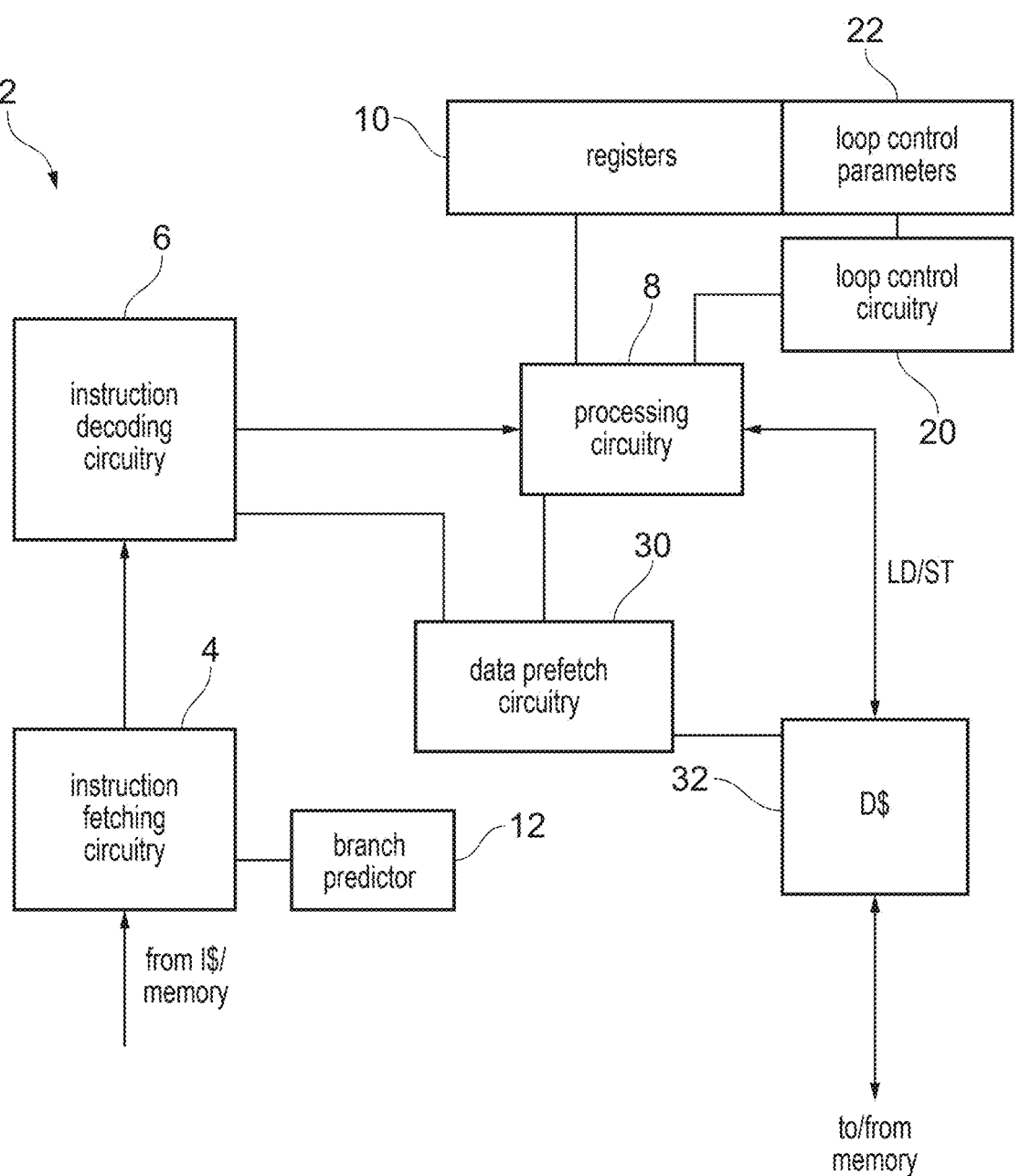
FIG. 1 illustrates an example of an apparatus comprising instruction decoding circuitry, processing circuitry and data prefetch circuitry.

An apparatus has decoding circuitry to decode instructions defined according to an instruction set architecture (ISA); processing circuitry to perform data processing in response to the decoded instructions; and prefetch circuitry to generate a prefetch request, the prefetch request comprising a request for data to be prefetched into a cache corresponding to an address predicted to be accessed by the processing circuitry in future. Prefetching can be useful to improve processing performance. By prefetching data in advance of its predicted use, the likelihood that a given memory access misses in the cache can be reduced. This can be particularly helpful for workloads, such as neural network models, which involve fetching of large amounts of data from memory, and for which memory access latency can be significant bottleneck in performance. Prefetching allows the hardware to proactively bring data into the cache before it is needed, to help hide the memory access latency.

However, the prefetching circuitry may consume a certain amount of circuit area and power in the logic which monitors activity of the processing circuitry and selects the addresses for which prefetch requests are generated. Some prefetchers use complex logic to store and compare information tracking address access patterns, to examine the access patterns for identifying stride sequences or other regular patterns that would enable prediction of future access patterns based on the addresses currently being accessed. In some use cases, there may be a limited budget available for circuit area and power consumption, and so measures to reduce the amount of circuit area/power consumed in offering a given amount of performance uplift can be helpful. Also, such prefetcher training methods may take some time to latch on to a stream of accesses with sufficient confidence to be able to generate predictions. For relatively short-lived access patterns, the training period may be too long to allow a performance benefit from the prefetcher predictions, as by the time the training is carried out to allow prefetch requests to be generated, the access pattern may be almost finished.

Some ISAs may support one or more types of loop control instruction which provide an explicit loop presence hint indicating that a sequence of instructions to be executed includes a program loop body to be iterated. Other ISAs do not support such types of loop control instruction, but instead would implement looping functionality using generic conditional branch instructions which can also be used for other non-looping program flow behaviour, and so do not give the processing circuitry any explicit hint that a loop is being processed. Hence, the mere fact that high-level program code (such as code written in C, Java, Python, etc.) contains program loops does not mean that the compiled machine code actually seen by the processor hardware (defined according to the ISA supported by that hardware) would be provided with any instructions explicitly indicating the presence of a loop. However, some ISAs do provide explicit loop control instructions which give an explicit hint that a loop is present. Such ISA instructions can be helpful to enable micro-architectural processor hardware designers, if they wish, to implement performance-improving measures such as hardware for explicitly triggering loop branch operations without the need for branch prediction and/or without the need for the loop controlling branch instructions to consume instruction slots in a processing pipeline.

The inventors have recognised that such loop control instructions can provide useful prefetch hints which help to reduce the amount of training resource needed to make prefetch predictions of future address access patterns. As looping program flow patterns are likely to contain regular patterns of memory accesses, especially in use cases such as neural network applications where use of such loop control instructions may be common for controlling relatively tight loops, the presence of a loop control instruction can be a significant hint that there is likely to be a stream of prefetch requests that could be useful for improving performance. Also, once the loop control instruction has been identified, a property of at least one instruction of the program loop body associated with the loop indicated by the loop control instruction can be useful for determining parameters of the stream of prefetch requests with less cost (in terms of circuit area or power consumption) than would typically be incurred by detecting the same patterns based merely on observation of target addresses of a sequence of memory accesses over time.

Hence, the prefetch circuitry may determine whether the decoding circuitry has detected the loop control instruction in a sequence of decoded instructions, and in response to determining that the decoding circuitry has detected the loop control instruction, activate generation of at least one loop-control-instruction-triggered stream of prefetch requests specifying addresses predicted based on a property of at least one instruction of the program loop body whose presence is indicated by the loop control instruction. By using, as a prefetch trigger, hints derived from a loop control instruction and/or other surrounding instructions designated as part of a loop by the loop control instruction, this can help reduce the circuit area and power cost needed to gain a given amount of performance uplift, or can increase the performance uplift achievable with a prefetcher having a given circuit area and power cost budget.

In some examples, the prefetch circuitry is configured to activate generation of a given loop-control-instruction-triggered stream based on training information gathered in a single iteration of the program loop body. The hints detected based on the loop control instruction(s) (e.g. enabling identification of which instructions are part of the program loop body) mean that it is feasible to detect the parameters of the loop-control-instruction-triggered stream of prefetch request based on a single pass through the program loop body. In contrast, for typical training methods used for stride prefetchers, it would take at least three iterations of the program loop before a comparison of the stride between addresses of a given load instruction in the first and second iterations and the stride between addresses of the given load instruction in the second and third iterations can be performed to determine that there is a constant stride offset between addresses accessed in successive loop iterations. Hence, by using hints from loop control instructions to trigger prefetching, the training period can be greatly reduced increasing the benefit of prefetching even on loops with very few iterations, which can be common in some workloads such as neural network processing. By using hints from the loop control instructions to reduce the prefetcher warmup time when a loop is encountered, performance can be greatly improved for a given amount of prefetcher training circuit overhead.

In some examples, each loop-control-instruction-triggered stream of prefetch requests comprises prefetch requests specifying addresses at intervals of a constant stride determined relative to a stream start address, the stream start address depending on a target address of a load instruction detected within the program loop body. Such constant stride patterns are extremely common when a program loop is detected, so it can be most efficient for the loop-control-instruction-triggered streams of prefetch requests to use a stride prefetch scheme, rather than other prefetcher techniques aimed at handling more complex patterns. The prefetch circuitry can detect a target address of a given load instruction detected within the program loop body (e.g. detected in the next iteration of the program loop processed after detection of the loop control instruction), and use that target address as the stream start address for a new stride sequence of prefetch request generation.

In some examples, the constant stride corresponds to a size of a single cache line. In many workloads which tend to use such loop control instructions (such as neural network workloads), it is very common for the data loaded by a given load instruction in successive iterations of a loop to be located contiguously within the memory address space, rather than stepping through memory in units of a given stride skipping over some chunks of data in between. Hence, in many implementations, it is not necessary for the prefetch circuitry to attempt to predict the amount of data loaded per loop iteration (which could vary based on a parameter of the load instruction), since a stride sequence of prefetch requests incrementing the prefetch target address by a size corresponding to a single cache line per prefetch request may be sufficient to ensure prefetcher coverage of the contiguous block of data likely to be accessed in remaining iterations of the program loop body.

The stream start address is one example of a prefetch parameter which can be predicted based on hints derived from detection of a loop control instruction (in the case of the stream start address, being predicted based on the target address of a load detected in the program loop body identified based on the loop control instruction).

Another example of a prefetch parameter that can be determined based on detection of loop control instructions is an identification of how many streams of prefetch requests are to be activated corresponding to the program loop body associated with the loop control instruction(s). The prefetch circuitry may determine how many loop-control-instruction-triggered streams of prefetch requests are to be activated, based on a count of a number of distinct cache lines specified by target addresses of load instructions appearing within a single iteration of the program loop body. Some workloads may load multiple distinct rows or columns of a matrix structure within a single loop iteration of the program loop, using distinct load instructions targeting distinct cache lines in memory. In that case, it can be useful to activate multiple independent streams of prefetching to ensure that each of the rows/columns being processed in parallel by a loop iteration can keep pace in terms of performance, reducing the likelihood that a cache miss on a load of data from one of those rows/columns causes a delay to loads for other rows/columns being processed in the same loop. Hence, it can be beneficial to performance to detect, based on account of the number of distinct cache lines loaded with a single iteration of the program loop body, how many streams of prefetch requests are to be activated by the prefetch circuitry.

For example, the prefetch circuitry may have a counter which is reset in response to detection of a loop control instruction and then incremented for each distinct cache line loaded by a load instruction detected during monitoring of loads in a following loop iteration of the program loop body. The counter increments may be halted when that iteration completes (which can be detected either based on the presence of another loop control instruction, or based on micro-architectural loop control circuit logic which is initialised based on a parameter of the previously detected loop control instruction to trigger a loop return branch when program flow reaches a given instruction address indicating that a loop iteration is complete). The count of the number of loaded cache lines can then be used to allocate the corresponding number of prefetch streams (each stream comprising prefetch requests with prefetch target addresses at constant stride offsets relative to the respective target address of one of the respective cache lines loaded during the monitored loop iteration).

The prefetch circuitry may have a maximum number of streams of prefetch requests that can be supported simultaneously, so for some workloads the monitoring of loads within a loop iteration may find that the number of distinct cache lines loaded within one loop iteration is greater than the maximum number of streams supported by the prefetch circuitry. There can be relatively little benefit to allocating prefetch streams for only some of the address patterns being loaded within a program loop, while leaving other address patterns not covered by a prefetch stream, as any cache misses occurring for the addresses not covered by the prefetch stream will tend to delay progress for the loop iteration overall, and so in that case generation of prefetch streams for other address patterns occurring within the loop may be of little performance benefit.

Therefore, in some examples, in response to detecting that the number of distinct cache lines is greater than a threshold number, the prefetch circuitry may suppress activation of said at least one loop-control-instruction-triggered stream of prefetch requests, and switch to a next-cache-line-prefetch mode in which the prefetch circuitry is configured to trigger, in response to a cache miss detected for a given address, generation of a prefetch request specifying an address that is offset relative to the given address by a predetermined amount. For example, the threshold number may correspond to a maximum number of streams of prefetch requests supported to be processed in parallel by the prefetch circuitry. If the loop contains a greater number of independent streams of loads than can be handled by the prefetch circuitry, then as the program loop may struggle to gain much benefit from only partially covering the detected loop load access patterns using stride prefetch streams, it may be preferred not to allocate any of the supported stride-based prefetch stream control slots for address sequences associated with the program loop, and instead conserve the stride prefetch resources for other purposes (e.g. other address sequences not related to the program loop identified based on the loop control instruction). Instead, the prefetch circuitry may switch to a next-cache-line-prefetch mode, where prefetch requests are triggered relative to currently detected demand loads observed by the prefetch circuitry, prefetching ahead of the target address of the latest demand load that misses in the cache. The next-line-prefetch mode can provide some performance benefit for the program loop body detected based on the loop control instruction, while conserving the more powerful stride based stream prediction resources for other purposes can provide better performance overall in cases where the number of streams required to fully cover the program loop using stride based streams is too large to be handled by the prefetch circuitry.

Some types of loop control instruction may specify an iteration count parameter indicative of a number of loop iterations for which the program loop body is to be iterated. This can be useful to allow software to express to hardware the loop run length so that the hardware can determine when to terminate the loop more reliably than is possible using branch prediction schemes.

The prefetch circuitry can exploit such an iteration count parameter provided by a loop control instruction, to determine, depending on the iteration count parameter of the loop control instruction, when to halt generation of the prefetch requests according to said at least one loop-control-instruction-triggered stream of prefetch requests. This can be helpful for performance because this can avoid "over-prefetching" where the prefetch circuitry, although initially correctly predicting addresses to be prefetched according to a given stream of accesses, continues to generate prefetch requests according to the predicted pattern beyond the end of the stream of demand accesses actually required by the instructions executed by the processing circuitry. Such over-prefetching can waste memory system bandwidth (hence slowing down processing of other memory accesses actually required by demand loads), and can pollute the cache with useless data causing other more useful data, which may still be accessed in future, to be evicted. By using the iteration count parameter expressed by loop control instruction, the prefetch circuitry can determine the point at which to terminate the stream of prefetch requests activated based on the loop control instruction, to reduce the likelihood of over-prefetching, and hence can improve performance. Hence, by considering information dependent on the iteration count parameter of the loop control instruction, the end of the prefetch address sequence (e.g. corresponding to reaching the end of a matrix dimension, such as a row or column) can be predicted much more efficiently (with lower hardware cost) than if hardware had to determine when to terminate prefetching solely from previous observation of addresses accessed.

There can be different ways of implementing the determination of when to halt generation of the prefetch requests based on the iteration count parameter. In some examples, the processing circuitry may initialise, depending on the iteration count parameter, a loop counter for tracking a number of remaining loop iterations of the program loop body, and the prefetch circuitry may halt generation of the prefetch requests according to said at least one loop-control-instruction-triggered stream of prefetch requests, in response to detecting based on the loop counter that a number of remaining loop iterations is less than a threshold number of loop iterations. For example, the loop counter may be the same counter that is used by instruction fetch circuitry to determine when to stop fetching additional iterations of the instructions of the program loop body, and can be reused by the prefetch circuitry to similarly determine when the loop is nearing its final iteration and so prefetching can be halted.

In some examples, the prefetch circuitry may predict based on the iteration count parameter the total number of prefetch requests expected to be needed in a given loop-control-instruction-triggered prefetch stream, and can then trigger the predicted number of prefetch requests to be generated, and halt prefetch generation for that stream once the required number of prefetch requests have been generated. For example, the prefetch circuitry may determine, based on the iteration count parameter and a load data size associated with a given load instruction of the program loop body, a number of prefetch requests to be generated for a given loop-control-instruction-triggered stream of prefetch requests. The load data size could be a default size determined independent of any load data size parameter of the given load instruction (e.g. it could be assumed by default that the load data size is the maximum possible size that could be supported for a given load). Alternatively, the load data size could be detected based on an actual load data size parameter detected for the given load instruction (the load data size parameter defining the amount of data to be loaded by that load instruction).

In some examples, in response to detecting that the iteration count parameter specified by the loop control instruction indicates that the number of loop iterations is less than or equal to a threshold number of iterations (e.g. the threshold could be 1), the prefetch circuitry is configured to suppress activation of the at least one loop-control-instruction-triggered stream of prefetch requests. In some use cases, the number of loop iterations to be processed may be data-dependent, varying based on a data value computed in previous processing performed before encountering the loop, so there may be some instances of encountering the loop control instruction when the iteration count parameter indicates that only one instance of the program loop body is needed, or in some cases, that zero loop iterations to be performed and so the program flow can skip the program loop body altogether. If the number of loop iterations is 0 or 1, there is no performance benefit to activating prefetch requests for this instance of the loop (if only one iteration is needed, then the first iteration would be used to detect the start addresses of the prefetch streams and then there would be no subsequent iterations left to benefit from the prefetch is triggered based on those start addresses). In some cases, depending on the latency of servicing prefetch request (which could risk the loop completing before the earliest prefetch requests have caused data to be prefetched into the cache), there may still be little benefit to prefetching if the number of iterations is relatively small (but greater than 1), so some implementations may choose to implement a threshold number of iterations greater than 1. For loops with greater numbers of iterations, prefetching is more likely to give a performance benefit, and the use of hints from loop control instructions enables earlier start of prefetching than if loop control instruction hints were not used.

In some examples, the loop control instruction comprises a zero-overhead loop control instruction. Zero-overhead looping is a technique for reducing the performance cost of loop control. An ISA may include support for a zero-overhead loop control instruction which, when executed, controls the processing circuitry to set at least one loop control parameters for controlling execution of one or more iterations of the program loop body. Having executed the zero-overhead loop control instruction, loop control circuitry provided in hardware can control iterations of the program loop body without needing the zero-overhead loop control instruction to be executed again, and without needing explicit branch instructions to be executed. For example, the loop control circuitry may detect when program flow reaches a particular branch point address identified by the at least one loop control parameter, and in response trigger a branch to a start of the program loop body, without needing an explicit branch instruction to be executed. Hence, remaining iterations of the program loop body can be executed more efficiently because the functional instructions of the program loop body make up the majority of the executed instructions as it is not necessary to execute further loop control instructions in each iteration of the loop. Also, performance can be improved because the hints from the zero-overhead loop instructions can express the point in program flow at which loop control branches are to be triggered and the number of loop iterations required, removing the need to rely on branch prediction to predict the program flow (and hence improving performance by eliminating the costly branch misprediction penalties). Of course, it will be appreciated that the overhead of the zero-overhead loop control is not actually zero, as there may be a small overhead in executing the zero-overhead loop control instruction and in providing the loop control circuitry, but the term "zero-overhead loop" is nevertheless the term of art used by engineers in the field of processor design to refer to loop control mechanisms which do not require the execution of an explicit loop controlling branch on each iteration of the loop. A zero-overhead loop can also be referred to as a "low-overhead loop".

In some examples, in response to the loop control instruction, the processing circuitry is configured to set at least one loop control parameter for controlling execution of one or more iterations of the program loop body; and the apparatus comprises loop control circuitry to control, based on the at least one loop control parameter, execution of one or more iterations of the program loop body, the program loop body excluding the loop control instruction itself. By avoiding the need to execute the loop control instruction on each loop iteration of the loop, pipeline slots can be freed for other instructions, improving pipeline utilisation and improving performance.

In some examples, the instruction set architecture supports at least one of the following types of the loop control instruction: a loop start instruction for execution before a start of the program loop body; and a loop end instruction for execution at an end of at least a first iteration of the program loop body. Some examples may support both a loop start instruction and a loop end instruction. Other examples may support only one of the loop start instruction and the loop end instruction. The prefetch circuitry could activate the prefetch streams based on detection of either the loop start instruction or the loop end instruction, or based on hints derived from both types of instructions.

In some examples, the loop control instruction comprises a loop start instruction specifying a loop end address and an iteration count parameter indicative of a number of loop iterations for which the program loop body is to be iterated. In response to determining that the iteration count parameter indicates that the number of loop iterations is zero, the processing circuitry is configured to trigger a branch to the loop end address. In response to determining that the iteration count parameter indicates that the number of loop iteration is non-zero, the processing circuitry is configured to initialise a loop count value to track a number of remaining loop iterations of the program loop body. Detection of such a loop start instruction can be used by the prefetch circuitry to trigger activation of prefetch streams based on stride sequences starting from start addresses detected based on target addresses of subsequent load instructions detected following the loop control instruction, and the iteration count parameter can be used to predict when to terminate prefetch generation for such streams.

In some examples, the loop control instruction comprises a loop end instruction specifying a loop start address. In response to the loop end instruction, the processing circuitry is configured to determine based on a loop count value whether a further iteration of the program loop body is required, and in response to determining that a further iteration of the program loop body is required, trigger a branch to the loop body start address. The loop end instruction can be useful to the prefetcher in demarcating the end of the program loop body, so that the prefetcher can identify when to stop counting distinct loaded cache lines, and start prefetching for the streams initialised based on the previous cache lines loaded in the program loop body.

In some examples, in response to the loop end instruction, the processing circuitry is configured to set at least one loop control parameter to indicate a branch trigger address corresponding to an address of an instruction preceding the loop end instruction. The apparatus may comprises loop control circuitry to trigger a branch to the loop body start address in response to determining, in response to program flow reaching the branch trigger address, that an additional iteration of the program loop body is required.

The loop-control-instruction-triggered prefetch activation may be useful for any processor supporting loop control instructions. However, while the technique could also be used in large processors with plentiful circuit area/power budget for prefetching, the loop-control-instruction-triggered prefetch activation can be particularly useful for processors with constrained budget for prefetch circuitry, as the use of hints from loop control instructions avoids the need for more circuit-area-intensive and power-hungry training logic to be provided. For example, this technique could be particularly useful for microcontrollers or other relatively low-power devices. For example, the instruction set architecture supported by the processing circuitry may be a 32-bit instruction set architecture (in which memory addresses used to address the memory address space have a maximum of 32 bits). In some examples, the processing circuitry may be in-order processing circuitry in which the processing circuitry is constrained to execute instructions in program order. In some examples, the instructions executing on the processing circuitry may specify physical addresses directly corresponding to locations in the memory system (rather than specifying virtual addresses requiring translation into physical addresses). In some examples, the ISA supported by the processing circuitry may be the M-profile architecture provided by Arm® Limited of Cambridge, UK.

Specific examples are now described with reference to the drawings.

FIG. 1 schematically illustrates an example of a data processing apparatus 2, for example a processor. For example, the processor could be a central processing unit (CPU), graphics processing unit (GPU) or other processing circuit capable of executing program instructions defined in a particular instruction set architecture (ISA). The apparatus has instruction fetching circuitry 4 for fetching program instructions from an instruction cache or memory, and instruction decoding circuitry 6 for decoding the fetched program instructions. Based on the decoded instructions, the instruction decoding circuitry 6 controls processing circuitry 8 to perform data processing operations represented by the instructions. Registers 10 are provided to store operands for the processed instructions, and results of executed instructions are written back to the registers 10. The processing circuitry 8 includes various execution units, such as an ALU for performing arithmetic or logical operations, a branch unit to process branch operations, and load/store circuitry which controls loading of data from the memory system to the registers 10 and storing of data from the registers 10 to the memory system in response to load/store instructions (the memory system can include one or more data caches and main system memory).

The apparatus 2 has branch prediction circuitry 12 for predicting the outcomes of branch instructions to be processed by the processing circuitry 8. The branch prediction state circuitry 12 maintains one or more branch prediction storage structures indicating prediction state information that can be used by the branch prediction circuitry 12 to predict which instruction addresses relate to branch instructions, and for those instruction addresses predicted to relate to branch instructions, predict an outcome of the branch instructions, such as a prediction of whether the branch will be taken or not taken, or a prediction of branch properties such as a branch type or branch target address (the address to which the branch directs program flow when taken). Outcomes of branch instructions executed by the processing circuitry 8 are used to update the prediction state information in the branch prediction structures 14. Any known branch prediction technique may be used to maintain the branch prediction state and predict the branch outcomes. The predictions made by the branch prediction circuitry 12 are used to control which instructions are fetched by the instruction fetch stage 4. The instruction to be fetched next after a branch can be selected based on whether the branch prediction circuitry 12 predicts the branch is taken or not taken. If a branch misprediction is detected, when the actual outcome of the branch determined by the processing circuitry 8 differs from the prediction made for that branch by the branch prediction circuitry 12, a branch misprediction recovery operation can be initiated, for example to flush from a processing pipeline instructions that were incorrectly fetched after the branch and resume fetching of instructions from the instruction that should have been executed after the branch given the correct branch outcome. Also, the branch prediction state storage structures of the branch predictor 12 may be updated in response to the branch misprediction, to reduce the probability of the misprediction happening again in future.

The apparatus 2 also has loop control circuitry 20 for controlling program flow during execution of a zero-overhead loop. The instruction set architecture supported by the instruction decoding circuitry 6 and processing circuitry 8 includes at least one type of zero-overhead loop control instruction which, when decoded, causes the processing circuitry 8 to set one or more loop control parameters in a loop control parameter store 22. The one or more loop control parameters can be used by the loop control circuitry 20 to control the instruction fetch circuitry 4 to fetch the instructions of the program loop for a number of iterations without requiring an explicit branch instruction to be executed on each iteration of the zero overhead program loop. This contrasts with standard techniques for implementing program loops where an explicit loop controlling branch would be needed on each iteration to control branching back to the start of the loop for the next iteration.

The apparatus 2 also comprises data prefetch circuitry 30 (also referred to as a prefetcher), for generating prefetch requests for prefetching data into a data cache 32 accessible to the processing circuitry 8. Each prefetch request comprises a request for data to be prefetched into the data cache 32 corresponding to an address predicted to be accessed by the processing circuitry in future. The prediction of which addresses will be accessed by the processing circuitry can be made based on training information derived from monitoring of address access patterns of load/store requests issued by the processing circuitry 8, as well as based on other hints such as signals from the instruction decoding circuitry 6 indicating that particular types of instructions have been detected in the stream of executed instructions. In particular, when the instruction decoding circuitry 6 detects presence of a loop control instruction as discussed in more detail below, the data prefetch circuitry 30 may receive a signal indicating that the loop control instruction has been detected, and may trigger activation of one or more streams of loop-control-instruction-triggered prefetch requests to addresses which depend on properties of the loop control instruction and/or other instructions of a program loop body associated with the loop control instruction.

Figure 2:
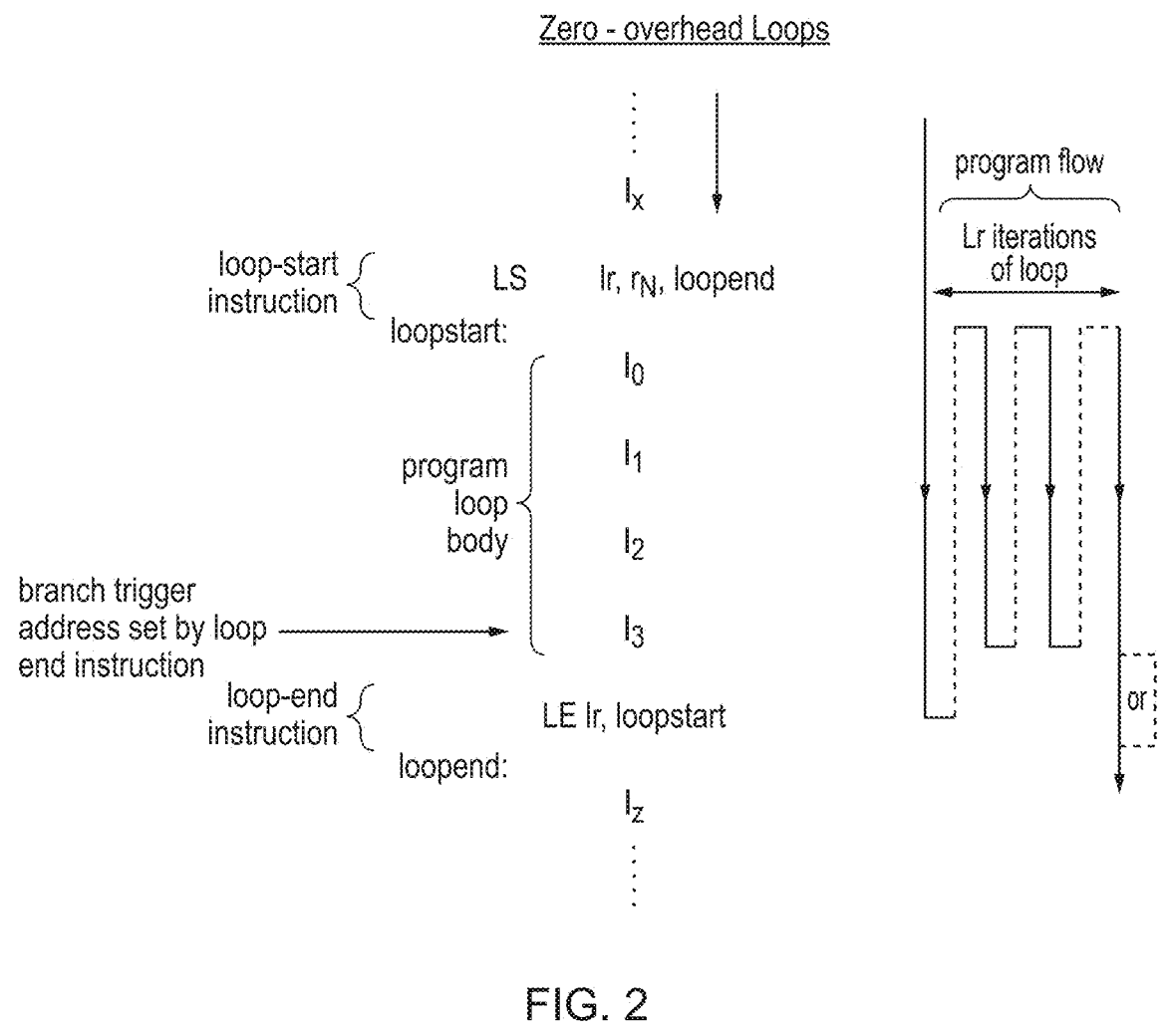

FIG. 2 schematically illustrates an example of processing of a zero-overhead loop, in an example where the ISA supports a zero-overhead loop start instruction LS and a zero-overhead loop end instruction LE. The zero overhead loop start instruction LS is designed to be included in the program code before the first instruction $I_0$ of a program loop body to be executed on each iteration of the loop. The zero-overhead loop end instruction LE is designed to be included in the program code after the final instruction $I_3$ of the program loop body.

The zero-overhead loop start instruction LS specifies an iteration count parameter, in this example specified using a value stored in a register $r_N$ specified by the instruction, and a value indicative of a loop end address "loopend" which is indicative of an instruction $I_Z$ following the end of the program loop body. The iteration count parameter identifies a target number of iterations of the program loop body to be performed. In this example, in response to the LS instruction, the processing circuitry 8 copies the indication of the target number of iterations to a link register (lr), which is a register used for storing a function return address when a function is called. By copying the target number of iterations to the link register, this allows the general purpose register $r_N$ used to specify the iteration count parameter to be reused for other purposes within the program loop body. The value included in the link register may act as a running count of the number of remaining iterations of the loop to be performed, and may be decremented each time the program flow returns to the start of the program loop body (whether that return to the start of the loop is triggered by the loop end instruction LE or by the loop control circuitry 20 based on the loop control parameters). Maintaining this running count within the link register can be convenient because it means that the processing circuitry 8 when processing the LE instruction to check the iteration count, and the loop control circuitry 20 which controls looping for subsequent iterations, do not need to be aware of which particular general purpose register was used by the LS instruction to specify the target number of iterations. It will be appreciated that saving the target number of iterations to the link register is just one example and there may be other ways of preserving the indication of how many iterations are to be executed in the loop. For example the target number of iterations could be saved to the loop control parameter store 22. The loop end address could be identified by the LS instruction in various ways, for example by specifying an offset relative to a reference address such as the program counter address of the LS instruction or relative to a base address stored in a register specified by the LS instruction. The loop end address could also be identified indirectly by specifying the number of instructions that occur between the LS instruction and the instruction $I_Z$ indicated by the loop end address. In general, the loop end address can be any parameter which enables identification of the address of the instruction $I_Z$ representing a point in program flow to which a branch is to be performed if the target number of loop iterations required is 0.

In response to the LS instruction, the processing circuitry 8 checks the indication of the target number of iterations, and if the target number of iterations is zero then a branch to the loop end address is triggered to skip over the entire program loop body. This behaviour can be useful because there may be some occasions when the target number of iterations may depend on a previous data-dependent operand, so that it is possible that the target number of iterations may be zero on some occasions, and using the LS instruction to trigger the jump over the loop body may be less prone to branch misprediction than if a conditional branch instruction was used to check whether the loop needs to be executed. In some implementations the LS instruction may also trigger setting a loop control parameter in the loop control parameter store 22 to indicate that zero-overhead loop is in progress.

The zero-overhead loop end instruction LE specifies a value indicative of a loop start address "loopstart" which is indicative of an instruction $I_0$ at the start of the program loop body. Again, the loop start address could be specified by the instruction in various ways, for example as an absolute address or as an offset relative to a reference address such as an address stored in a particular register or the instruction address of the loop end instruction itself. The loop start address could also be implicitly identified by specifying the number of instructions that appear between the instruction $I_0$ at the start of the program loop body and the loop end instruction LE. In response to the instruction decoding circuitry 6 decoding the zero-overhead loop end instruction LE, the processing circuitry 8 determines, based on the iteration count value maintained in the link register or a different location (e.g. as part of the loop control parameters 22) whether at least one further iteration of the program loop body is still required. At least when a further iteration of the program loop body is required, the processing circuitry 8 sets the stored loop control parameters to specify a value indicative of the loop start address "loopstart" as well as a value indicative of a branch trigger address which indicates an instruction at which a branch to the loop start address is to be triggered by the loop control circuitry for any further iteration of the program loop body. These addresses can be represented in the stored loop control parameters 22 in different ways, e.g. using absolute or relative addresses, using a representation which omits certain bits that can be implicitly be determined (e.g. bits that are 0 for all valid instruction addresses), or as a hash function of the address that can be compared against a corresponding hash generated from a program counter address representing the current point of program flow reached, to determine whether it is likely that the program counter address matches the address from which the hash was generated.

In the example shown in FIG. 2, the branch trigger address may implicitly be defined as the address of the instruction $I_3$ immediately preceding the LE instruction, so that the loop end instruction itself does not need to explicitly identify the branch trigger address. However, other variants of the zero-overhead loop end instruction LE could specify a parameter identifying the branch trigger address.

Also, in response to decoding of the zero-overhead loop end instruction LE, at least when it is determined that at least one further iteration is required, the value stored in the link register (or if stored elsewhere, the running count of the number of remaining iterations) is decremented. Also, in response to the decoding of the zero-overhead loop end instruction LE, when it is determined that at least one further iteration of the program loop body is required, the processing circuitry 8 triggers a branch to the instruction at the loop start address, which in this example is instruction $I_0$.

Hence, for the first iteration through the zero-overhead loop, the executed stream of instructions includes the zero-overhead loop start instruction LS, the instructions $I_0$ to $I_3$ of the program loop body and the zero-overhead loop end instruction LE. However, by the time the loop end instruction LE has been processed, the loop control parameters stored in the loop control parameter store 22 now specify information allowing the branch trigger address and loop start address to be identified without needing a subsequent branch instruction or the loop end instruction LE to be executed again for further iterations of the program loop body. Hence, for subsequent iterations through the program loop body, each time program flow reaches the instruction $I_3$ at the branch trigger address, the loop control circuitry 20 automatically triggers a branch back to the loop start address, with the program loop body excluding the loop end instruction LE itself so that the overhead of the loop end instruction is encountered only on the first iteration of the zero-overhead loop. The program loop body also does not include the loop start instruction LS.

Figure 3:
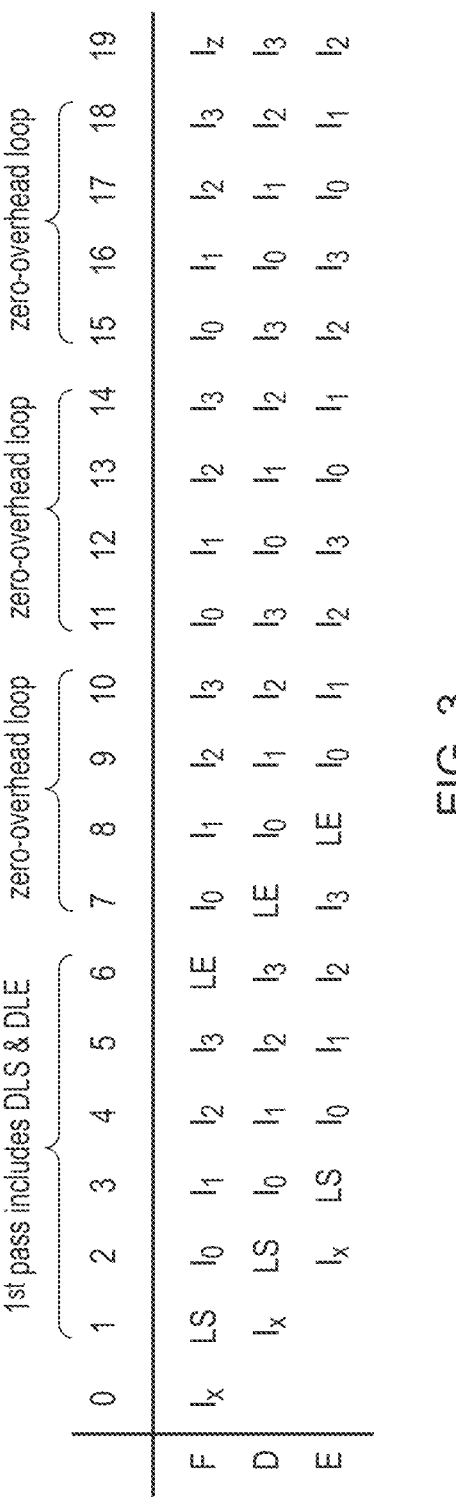
FIG. 3 is a timing diagram illustrating instructions processed in a zero-overhead loop.

FIG. 3 shows a pipelined timing diagram illustrating the fetching, decoding and execution of the stream of instructions shown in FIG. 2 by the instruction fetch circuitry 4, instruction decoding circuitry 6 and processing circuitry 8 respectively, for a number of iterations of the program loop body of the zero-overhead loop. As shown in FIG. 3, the LS and LE instructions only need to be executed in the first pass through the loop and subsequently the only fetched, decoded and executed instructions are the instructions of the program loop body itself so that the later iterations do not incur any performance penalty associated with loop control instructions.

Sometimes, an exception, fault or interrupt may occur partway through processing zero-overhead loop, and this could lead to an exception handler being executed. To prevent the loop control circuitry 20 incorrectly controlling the instruction fetch circuitry 4 to fetch the instructions of the program loop body while the handler should be executed, the loop control parameters stored in the loop control parameter store 22 may be invalidated in response to the exception, fault or interrupt. It is possible to preserve the stored loop control parameters in a state in which they are not used for controlling instruction fetching, to allow the loop control to resume once the handler has finished. However, even if that loop control state is not preserved during the handling of the exception, fault or interrupt, this is not a problem because on the first iteration of the zero-overhead loop performed after returning from the handler, if the loop control state has been lost then the loop end instruction LE will be encountered once more and can then reset the loop control state (e.g. restoring the loop start and branch trigger addresses) to control the loop control circuitry 20 to control looping program flow and omit the processing of the LE instruction on subsequent iterations of the loop.

The inclusion of the loop start instruction is optional, as on other occasions the particular number of iterations to be performed in the loop may not be known in advance (for example, the loop could continue to execute until at certain condition is satisfied, with that condition being evaluated within the program loop body). Hence, in other examples the zero-overhead loop end instruction could be the only zero-overhead loop control instruction included in the program code. In this case, there is no need for the loop end instruction to check a running count of iterations in the link register or decrement that running count. Instead, in the absence of an earlier loop start instruction the zero-overhead loop may continue to iterate until a break condition (evaluated by a conditional branch instruction included within the program loop body) determines that program flow should branch out from the program loop body to another instruction that is not part of the program loop body.

In the example of FIG. 2 the loop start instruction is included immediately before instruction $I_0$ at the start of the program loop body. However, this is not essential and it would be possible for other instructions to be included between the loop start instruction and the start of the program loop body, which could be used to ensure that certain preliminary functions are performed before the first iteration of the program loop body which are not required for subsequent iterations. Similarly, in an implementation where the LE instruction explicitly identifies the branch trigger address, it would also be possible for additional instructions to be included between the end of the program loop body identified by the branch trigger address and the LE instruction itself.

Figure 4:
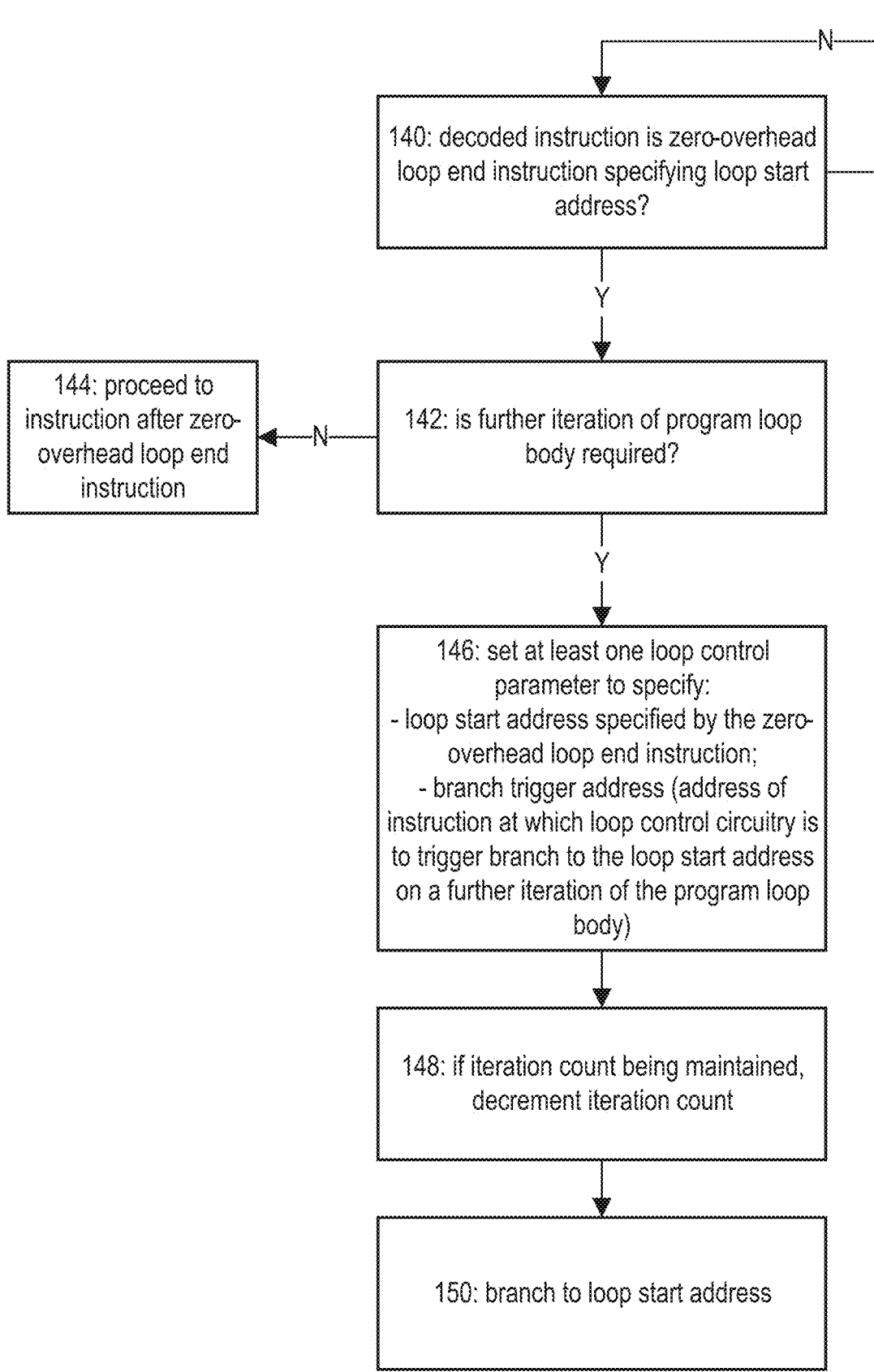
FIG. 4 is a flow diagram illustrating processing of a loop end instruction.

FIG. 4 is a flow diagram showing in more detail processing of a particular example of a zero-overhead loop control instruction, which in this example is the zero-overhead loop end instruction LE mentioned above. At step 140 the instruction decoding circuitry 6 detects, based on the encoding of the next instruction to be decoded, whether the next instruction is the zero-overhead loop end instruction LE. If the instruction being decoded is not the zero-overhead loop end instruction then control signals are generated to control the processing circuitry 8 to perform another type of processing operation. If the decoded instruction is the zero-overhead loop end instruction LE, the instruction specifies a value indicating a loop start address.

If the zero-overhead loop end instruction is identified by the instruction decoding circuitry 6, then at step 142 the processing circuitry 8, under control of the instruction decoding circuitry 6, determines whether a further iteration of the program loop body will be required. For example, if the loop iteration count parameter is being maintained (e.g. in the link register) then the loop iteration count parameter may be used to determine whether a further iterations required. For while loops (for which the loop start instruction may not have been provided) such a loop iteration count parameter may not be maintained and in that case the processing circuitry 8 may determine by default that a further iteration of the program loop body may be required if there is no indication of how many remaining iterations are needed. If it is determined that no further iteration of the program loop body is required then at step 144 program flow is allowed to proceed to the next instruction after the zero-overhead loop end instruction LE (e.g. instruction $I_Z$ in the example of FIG. 2).

If it is determined at step 142 that a further iteration of the program loop body is required, then at step 146 the processing circuitry 8 sets the at least one loop control parameter to specify values indicating a loop start address as specified by the operands of the zero-overhead loop end instruction and a branch trigger address which could either be implicitly defined as the address of the instruction preceding the zero-overhead loop end instruction or could be specified by an operand of the zero-overhead loop end instruction. The branch trigger address represents an address of an instruction at which the loop control circuitry 20 is, for further iterations of the program loop body, to trigger a branch to the instruction at the loop start address. For example, in FIG. 2 the branch trigger address is an address of instruction 13 which represents the final instruction of the program loop body.

At step 148, if an iteration count tracking the number of remaining iterations of the program loop body is being maintained, then the iteration count is decremented (for example the value stored in the link register can be decremented). At step 150, the processing circuitry 8 triggers a branch to the instruction at the loop start address. Hence, if the instruction at the loop start address has not already been fetched by the instruction fetch circuitry 4, the instruction fetch circuitry 4 is controlled to fetch that instruction and if any other instructions have already been fetched following the loop end instruction then these instructions are flushed from the pipeline.

Figure 5:
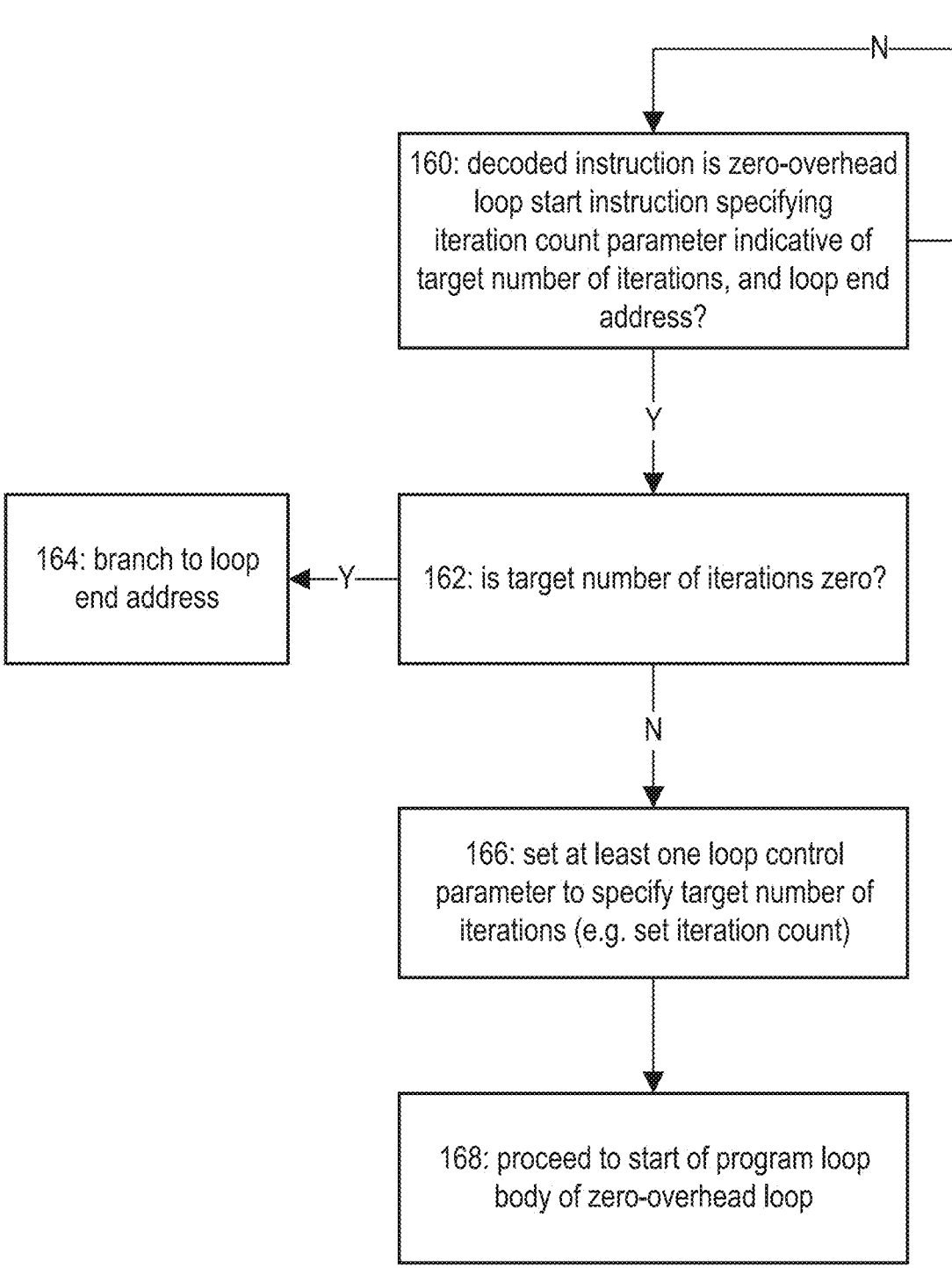
FIG. 5 is a flow diagram illustrating processing of a loop start instruction.

FIG. 5 is a flow diagram illustrating processing of another example of a zero-overhead loop control instruction, which is the zero-overhead loop start instruction LS mentioned above. At step 160, the instruction decoding circuitry 6 detects whether the next instruction to be decoded is the zero-overhead loop start instruction. If not then the instruction decoding circuitry 6 generates control signals for controlling the processing circuitry 8 to perform a different type of operation other than the zero-overhead loop start operation. If the decoded instruction is the zero-overhead loop start instruction then the instruction specifies an iteration count parameter indicative of a target number of iterations to be performed for a subsequent program loop body, and a value indicative of a loop end address representing address to which a branch can be made if the target number of iterations is zero.

In response to decoding of the zero-overhead loop start instruction, at step 162 the processing circuitry 8 determines whether the target number of iterations indicated by the iteration target parameter is zero. If the target number of iterations is zero, then at step 164 the processing circuitry 8 triggers a branch to the instruction at the loop end address identified based on an operand of the zero-overhead loop start instruction. If necessary, subsequent instructions already fetched beyond the zero-overhead loop start instruction can be flushed and the instruction fetch circuitry 4 may resume fetching of instructions from the instruction at the loop end address.

If at step 162 the target number of iterations was determined to be greater than zero, then there is no need to trigger the branch described for step 164. Instead, at step 166 the processing circuitry 8 may set at least one loop control parameter to specify the target number of iterations. For example, the iteration count value mentioned above may be written to the link register or to another location. At step 168, the processing circuitry 8 allows program flow to proceed to the start of the program loop body of the zero-overhead loop.

FIGS. 2 to 5 show two particular examples of loop control instructions (the LS and LE instructions), but it will be appreciated that other instruction set architectures could use a different form of zero-overhead loop control instruction. For example, some architectures may only support a loop start instruction, so that the branch trigger address and loop start address may be configured in response to a loop start instruction, rather than in response to a loop end instruction as shown in FIG. 2. Other examples, may only support a loop end instruction, with the loop end instruction providing the iteration count parameter which controls number of remaining loop iterations, in a similar way to the iteration count parameter provided by the loop start instruction in the example of FIG. 2. Hence, in general, the ISA may support at least one type of loop control instruction, where a loop control instruction refers to any architecturally defined instruction which provides an explicit loop presence hint indicating that a sequence of instructions to be executed includes a program loop body to be iterated.

Figure 6:
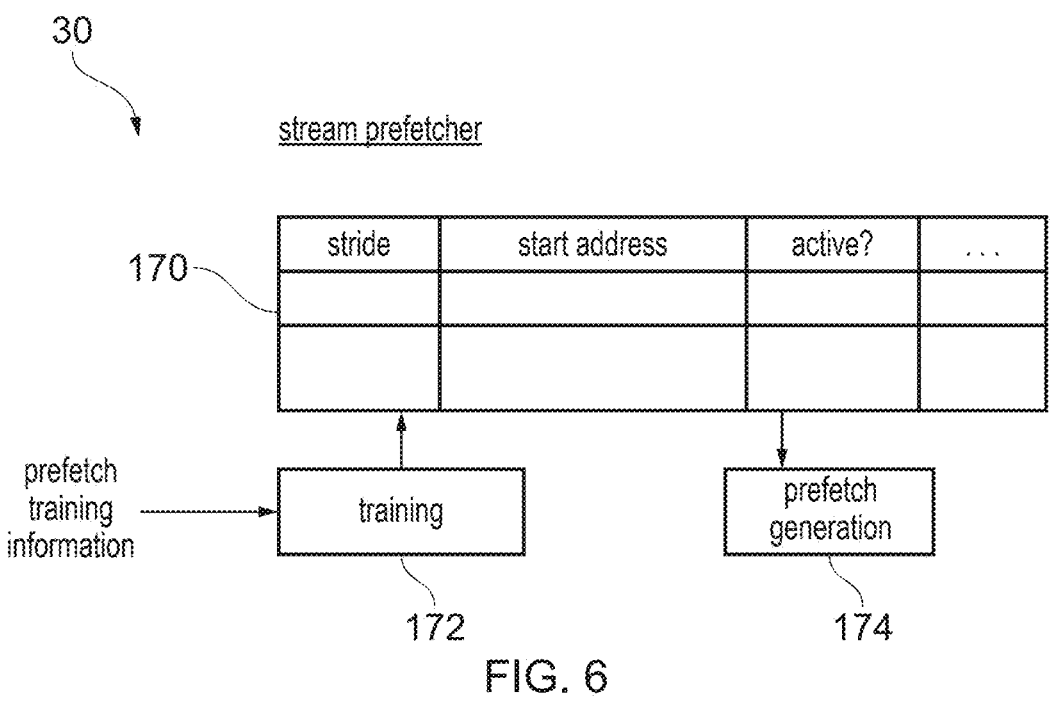
FIG. 6 illustrates an example of stream prefetching.

FIG. 6 illustrates an example of circuitry provided by the prefetch circuitry 30 to support stream prefetching. The prefetch 30 includes a stream tracking structure 170 which includes a number of stream tracking entries, each corresponding to a respective stream of prefetch requests. For each stream, the corresponding stream entry may specify information including:

a stride parameter indicating a stride offset between target addresses of successive prefetch requests in the stream;

start address relative to which the target addresses of prefetch requests are computed based on the stride;

an "active" indication indicative of whether prefetch generation is active for this stream.

etc.

Based on the tracking information recorded in the tracking structure 170 for a given stream, prefetch generation circuitry 174 generates corresponding prefetch requests and issues the prefetch requests to the memory system to trigger prefetching of corresponding data into the data cache 32.

It will be appreciated that there are many different ways of providing tracking information for tracking stride prefetch generation, so the particular information shown in FIG. 6 is just one example. In addition to the information shown in FIG. 6, other items of information about streams that could be recorded could include stream end information for predicting when to terminate prefetching for the stream, confidence information expressing a level of confidence in the predictions made for that stream, and/or replacement policy information used to determine, when a new stream needs to be allocated, which existing stream is the best candidate for evicting from the stream tracking structure 170.

The prefetcher 30 includes training circuitry 172 for training the information in the stream tracking structure 170 based on prefetch training information observed during program execution by the processing circuitry 8. For example, the training circuitry 172 may receive a sequence of addresses for which load/store accesses are requested by the processing circuitry 8, and may compare respective addresses in the sequence to identify any recurring stride patterns which could be the basis for a stream of prefetch requests. Processors with greater circuit area and power budget for the prefetcher 30 may have greater training resources (e.g. additional tracking capacity to track greater number of streams and perform comparisons between addresses of a wider group of addresses to increase the likelihood that stride based streams can be detected) than processors with smaller circuit area and power budget for the prefetcher 30. Hence, in a processor with limited circuit area and power budget, it can be helpful to use other hints derived from observation of program execution (other than the raw sequence of addresses being accessed) to make identification of stream patterns more efficient. Examples of using such hints derived from detection of loop control instructions are discussed below.

Figure 7:
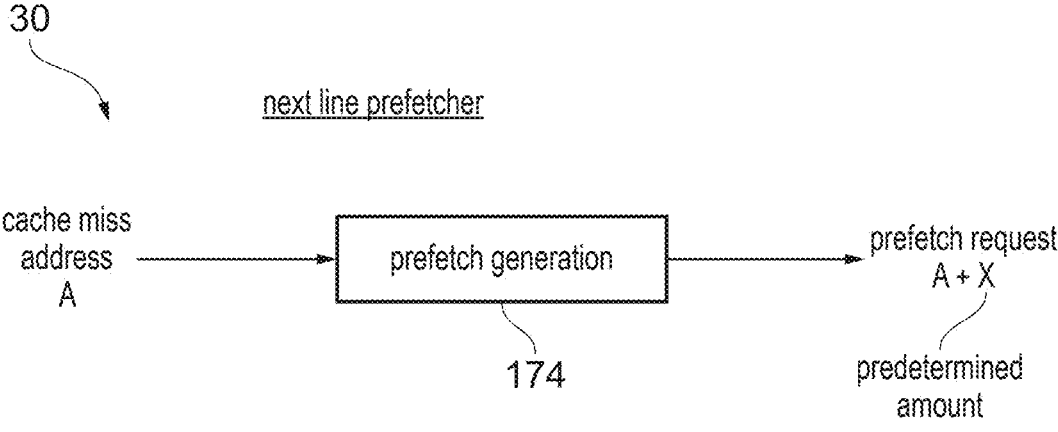
FIG. 7 illustrates an example of next line prefetching.

As shown in FIG. 7, the prefetchers 30 may also support next cache line prefetch mode, in which the prefetch generation circuitry 174 generates, in response to detecting a cache miss for a given address A, a prefetch request specifying an address A+X which is offset from the given address A by a predetermined amount X (e.g. X corresponding to a certain number of cache lines ahead of the given address A). The next cache line prefetch mode can provide some level of performance uplift compared to not prefetching at all, but may be less powerful than this stream prefetching shown in FIG. 6. However, in processor cores with limited area budget, there may be limited resource to track only a certain maximum streams in the stream tracking structure 170, and so next-line prefetching may be useful to help other access patterns not corresponding to one of the tracked streams in the tracking structure 170 gain some level of performance uplift from prefetching a distance ahead of the latest access that missed in the cache.

One particular type of workload that may particularly benefit from use of prefetching is neural network (NN) applications. NN applications are dominated by matrix dot product operations on data [input vector, network weights etc.] that is continuously fetched from memory. High performance processors rely on hardware data prefetchers to predict future access patterns to hide the memory latency to achieve higher IPC. However, the low-end high-performance processors used in inference edge devices have limited area budget [e.g. CPUs used in MCUs, e.g. those using the M-profile instruction set architecture provided by Arm® Limited]. To train and predict streaming patterns in NN application that have variable matrix dimensions and multiple parallel streams, more hardware is typically needed to track past access patterns to predict future memory accesses with higher accuracy, but such low-end processors generally don't have sufficient prefetch hardware resource to track these patterns. Therefore, low-end processors may typically suffer high performance loss due to memory access latency when processing NN workloads.

In the examples discussed in this application, a mechanism is described that uses low-overhead loop instruction hints to enhance data prefetcher efficiency by improving its accuracy and coverage to achieve high inference throughput in NN applications with limited hardware cost.

As mentioned above, There can be performance loss when processing loops with conventional branch instructions (which do not provide explicit loop presence hints), due to branch overheads [compare, branch, pipeline bubble] in the loop. To overcome these loop overheads, different instruction set architectures (e.g., M-profile architecture by Arm®, or digital signal processor (DSP) architectures) have low-overhead loop instructions (also referred as zero-overhead loop instructions) that provide hardware with the expected loop count to predict all iterations of the loop correctly. A property of these loop control instructions is that they force software to be more explicit about the loop conditions, which can be used to simplify hardware.

Below is a basic example of a low overhead loop

```
Loop Start [LS] instruction, loopBodyEnd
    ->//Establish loop count, Conditional forward branch
    <loop setup code>
loopBodyStart:
    <loop body>
    Loop End [LE] Instruction, loopBodyStart   -> //Conditional backward branch
    <code after Loop End instruction>
loopBodyEnd:
    LoopFallThrough code
```

The loop iteration count is passed to a Loop Start [LS] instruction. The LS instruction is a branch instruction that resolves to NOT TAKEN if the loop iteration count is non-zero and jumps to loopBodyEnd if iteration count is zero. A Loop End [LE] instruction tracks the iteration count and resolves into NOT TAKEN on last iteration. The LE instruction behaves exactly like a conditional branch instruction except that the condition here is a loop iteration value (TAKEN for value>0 and NOT TAKEN for value=0) and the loop iteration value is implicitly decremented on instruction execution.

To achieve higher performance, most of the Neural Network [NN] applications that are dominated by matrix multiplications include highly optimized assembly or intrinsics implementations for different architectures that use these low overhead loops. Typical template of NN inference kernels is as shown below:

```
Template 1:
    Loop Start [LS] instruction, loopBodyEnd
        Vector Load A    -> Load element from the input matrix A
        Vector Load B    -> Load element from the input matrix B
        Vector Multiple A , B
    Loop End [LE] Instruction
Template 2:
    Loop Start [LS] instruction, loopBodyEnd
        Vector Load A    -> Load element from the input matrix A
        Vector Load B.R1   -> Load element from the input matrix B, Row 1 elements
        Vector Multiple A , B.R1
        Vector Load B.R2   -> Load element from the input matrix B, Row 2 elements
        Vector Multiple A , B.R2
    Loop End [LE] Instruction
Template 3:
    Loop Start [LS] instruction, loopBodyEnd
        Vector Load A    -> Load element from the input matrix A
        Vector Load B.R1   -> Load element from the input matrix B, Row 1 elements
        Vector Multiple A , B.R1
        Vector Load B.R2   -> Load element from the input matrix B, Row 2 elements
        Vector Multiple A , B.R2
        Vector Load B.R3   -> Load element from the input matrix B, Row 3 elements
        Vector Multiple A , B.R3
        Vector Load B.R4   -> Load element from the input matrix B, Row 4 elements
        Vector Multiple A , B.R4
    Loop End [LE] Instruction
```

The above template examples are not exhaustive and only a few examples are included for reference.

Figure 8:
FIG. 8 illustrates examples of typical patterns of address accesses seen in neural network inference kernels.
Figure 8:
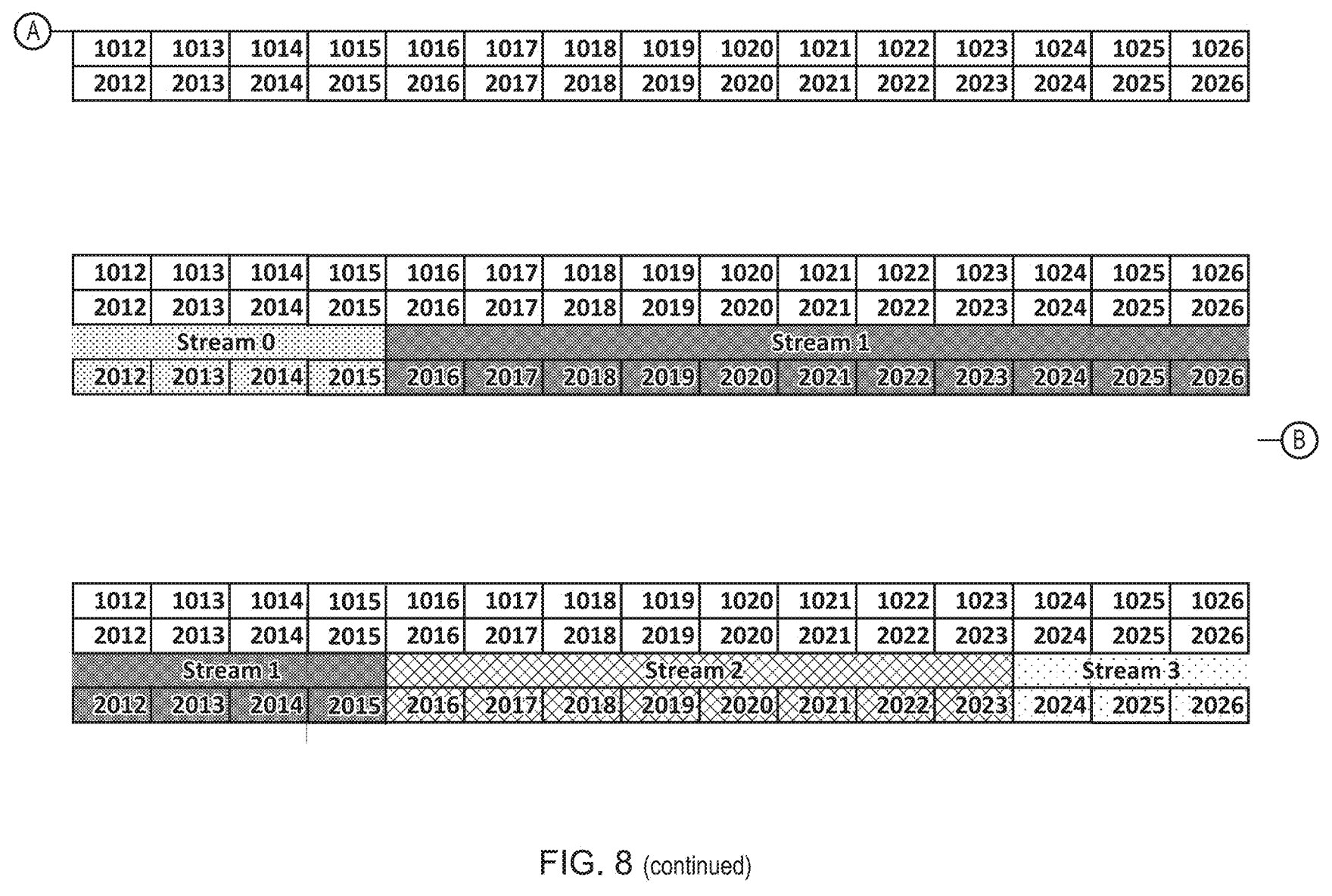

FIG. 8 illustrates typical address access patterns for the 3 template examples shown above.

In template 1, the vector load A loads addresses 1000-1011 . . . until the loop terminates, and the vector load B loads addresses 2000-2011 . . . .

In template 2, the vector load A still loads addresses 1000-1011 . . . , but there are two independent streams 2000, 2001, 2002 . . . and 2016, 2017, 2018 . . . which are interleaved according to vector loads B.R1 and B.R2.

In template 3, the vector load A still loads addresses 1000-1011 . . . , but there are four streams 2000, 2001, 2002 . . . ; 2008, 2009, 2010 . . . ; 2016, 2017, 2018 . . . ; and 2024, 2025, 2026 . . . , whose accesses are interleaved corresponding to vector loads B.R1, B.R2, B.R3 and B.R4 respectively.

Neural network models often involve large amounts of data that need to be fetched from memory. Memory access latency can be a significant bottleneck in overall performance. Data prefetching allows the hardware to proactively bring data into the cache before it is needed, helping to hide memory access latency. This makes the efficiency of data prefetcher very critical in the overall performance of the CPU on the NN applications.

The efficiency of data prefetcher is dependent on three metrics: 1. Accuracy, 2. Coverage and 3. Timing. Here a mechanism is described that uses low overhead loop instruction hints to quickly identify active streams along with stride patterns and reduce useless over prefetching by predicting matrix dimension boundary.

As shown in the NN kernel template examples, NN kernel loops are dominated by vector (SIMD—single instruction multiple data) load and multiply instructions. Neural networks can have large memory footprints and hence involve extensive data movement between various layers. The vector load instructions in the low overhead loops are essentially streaming in data elements of the matrix for a dot product operation. A performant data prefetcher would predict these future memory accesses and fetch data in advance to hide memory access latency.

However, there are few challenges for the data prefetcher to perform efficiently.

1. Identify the streaming pattern at the earliest opportunity.
2. Identify the number of independent streams in the loop (e.g. one stream for template 1, two streams for template 2 and four streams for template 3).
3. Avoid prefetching outside of the region of interest [outside the matrix boundary]—e.g. halt prefetching when the required number of loop iterations has completed, to reduce cache pollution caused by fetching in useless data that will not be needed and evicting other potentially more useful data.

The low overhead loop instructions designed to avoid loop overhead and enhance branch prediction can be used to improve data prefetcher efficiency. They provide hints that a data prefetcher can use to reduce the training overhead in identifying number of streams, stride patterns and the boundary of the matrix data elements to avoid over prefetching.

During the first iteration of the low overhead loop, the number of unique cache lines accessed between the Loop-Start [LS] instruction and LoopEnd [LE] instruction tells us the number of active streams. Each vector load is streaming data elements from the matrix rows/columns. With cache blocking optimizations, more rows within matrix can be accessed in parallel for better inference throughput. The data prefetcher can make a safe assumption of number of active streams equal to number of vector loads in the low overhead loop and use the unique cacheline addresses as the start address for each of these streams and start issuing prefetching requests immediately (based on only a single pass of the program loop for observation of training hints, rather than needing multiple passes to allow for computation of strides between addresses loaded in successive loop iterations as would be needed for traditional stride stream detection). Therefore, the use of loop control hints can help speed up the identification of a stream and hence enable prefetching to start earlier.

One of the inherent properties of streaming access patterns in NN kernels is that the matrix data elements accessed from memory are placed in a continuous block of memory and hence has a stride pattern of +1[next cacheline]. So, assuming stride pattern of +1 cache line for all the streams is a pretty safe bet.

To tackle the third challenge, avoiding prefetching outside the matrix dimension boundary, the LoopStart instruction in the loop overhead loop provides the loop count which indicates the number of iterations required to reach the end of row/column of the matrix we are processing currently. The data prefetcher can use this loop count and track the number of LoopEnd instructions retired in the pipeline to predict end of loop and stop prefetching outside the region of interest early. For example, the data prefetcher can use the loop iteration counter maintained by the loop control circuitry 20 (e.g. the count value tracked in the link register as mentioned earlier) to determine when the loop is nearing its end and so determine when to halt prefetching for the previously identified streams activated based on the loop control instruction detection.

Hence, by using the low overhead loop instruction hints, the prefetcher can reduce the number of memory accesses data prefetcher needs to observe before it finds streams with constant stride patterns and gains confidence to start prefetching, and predict early the end of matrix row/column data elements and avoid issuing useless prefetches outside the region of interest. This improves the data prefetcher's overall accuracy and coverage and does a better job at hiding the memory latency to enhance the overall throughput of neural network inference, especially on edge devices or other low-end processors which do not have sufficient circuit area budget for the prefetcher to be able to reliably track such access patterns using classical stride prefetcher training methods.

Figure 9:
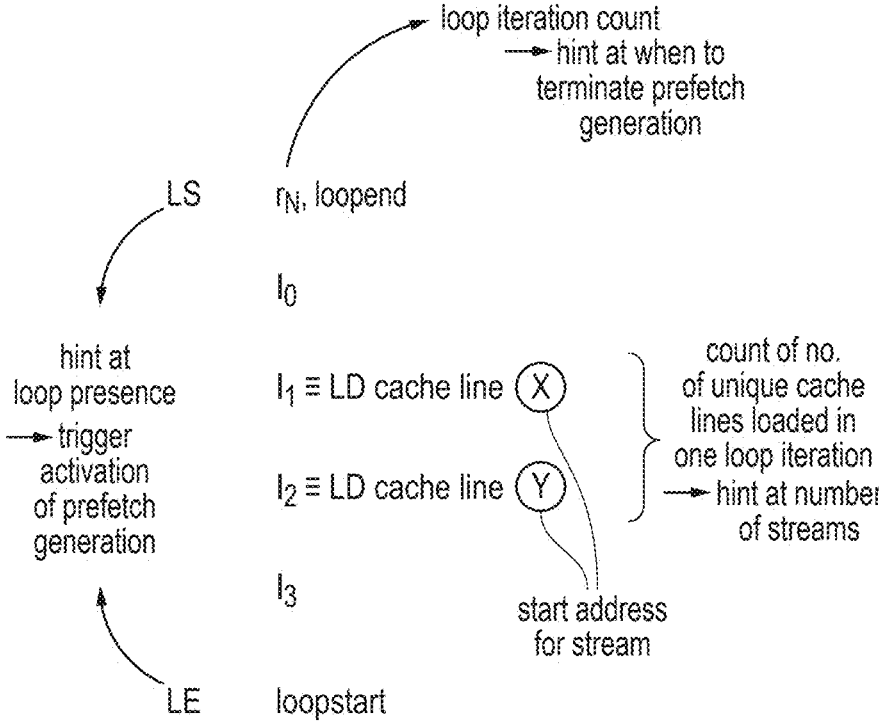
FIG. 9 schematically illustrates prefetch hints that can be deduced based on detection of loop control instructions in a sequence of executed instructions.

FIG. 9 summarises a number of prefetch hints which the prefetcher 30 can derived from the detection of loop control instructions, such as the LS and LE instructions mentioned above. Firstly, the presence of one of these instructions explicitly hints that a loop is present and therefore can act as a trigger to activate circuit logic for detecting and generating loop-control-instruction-triggered streams of prefetch requests. In the example of FIG. 9 a loop start instruction LS is present and so the loop start instruction may act as the primary trigger for activating prefetch generation, but in some workloads the LS instruction may not be used and it may instead be the loop end instruction LE which serves as the trigger for activating prefetch generation.

As shown in FIG. 9, based on the number of unique cache lines loaded in one loop iteration (detected relative to positions of one or more loop control instructions detected by the instruction decoder 6), the prefetcher can determine the number of independent streams of prefetch request to be generated corresponding to the detected loop. For example, the prefetcher may be triggered, based on the detection of the loop control instruction (e.g. LS or LE) to count the number of cache lines loaded until the next loop control branch occurs (e.g. the number of cache lines loaded between the LS and LE instructions in this example), and use this to determine how many streams to activate (with each activated stream being a +1 stride stream starting from the address X or Y of a corresponding load detected in the program loop body). In this example, the number of accessed cache lines can be counted as those cache lines loaded between an instance of the LS instruction and an instance of the LE instruction. However, as mentioned above, in some examples the ISA may not support a loop start instruction, or alternatively even if the ISA supports the loop start instruction, some programmers or compilers may not use the loop start instruction for some use cases (e.g. while loops which should execute indefinitely until a break condition, evaluated by a conditional branch inside the loop body, is satisfied). Therefore, in other examples the number of accessed cache lines can be counted between successive instances of the LE instruction (or alternatively between successive instances of triggering the loop return branch back to "loopstart", if triggered in hardware without requiring explicit fetching/decoding of the LE instruction on each loop iteration).

Also, as shown in FIG. 9, one of the loop control instructions (in this example LS, but it could also be a loop end instruction in other examples) specifies a loop iteration count parameter which indicates the number of loop iterations for which the loop body is to be iterated, and the prefetch circuitry 30 may use this iteration count parameter as a hint for determining when to terminate generation of prefetch requests according to a given stream. For example, the prefetch circuitry 30 may either predict, based on the loop iteration count and an estimate of the amount of data loaded per loop iteration for a given load instruction occurring within the loop body, how many prefetch requests will be required to fully prefetch the data estimated to be loaded within the loop body corresponding to a given stream, and terminate the stream once the required number of prefetch requests are generated. Alternatively, rather than attempting to explicitly calculate the number of prefetch requests required, the prefetch circuitry 30 may monitor the iteration count tracking parameter which is maintained by the loop control circuitry 20 as loop iteration progresses (where that iteration count tracking parameter will depend on the loop iteration count initially specified by the loop control instruction, as well as on the number of loop iterations processed since the start of the loop), and halt prefetching for a given stream when the iteration count tracking parameter indicates that the number of remaining iterations has reached (or dropped below) a given threshold for terminating prefetch.

Figure 10:
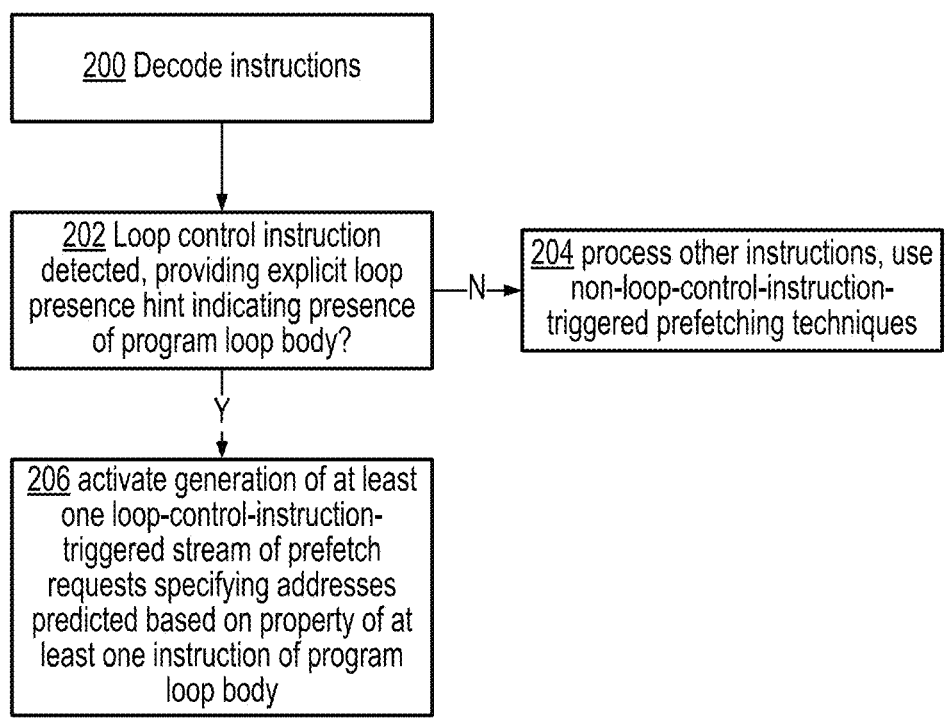
FIG. 10 illustrates a method comprising loop-control-instruction-triggered generation of a stream of prefetch requests.

FIG. 10 illustrates steps for controlling prefetching based on detection of loop control instructions. At step 200, the instruction decoding circuitry 6 decodes instructions for execution by the processing circuitry 8. At step 202, the instruction decoding circuitry 6 determines whether a loop control instruction is detected in the sequence of decoded instructions. The loop control instruction is an instruction providing explicit loop presence hint information indicating the presence of a program loop body to be iterated within the sequence of instructions. If the decoded instruction is not a loop control instruction, then at step 204 the instruction decoding circuitry 6 controls the processing circuitry 8 to process another type of instruction, and the prefetch circuitry 30 uses non-loop-control-instruction-triggered prefetching techniques to determine which prefetch requests should be generated (e.g. stride detection training methods may be used to identify stride-based prefetch streams, and/or next line prefetching may be used).

If a loop control instruction is detected, then at step 206, the prefetch circuitry activates generation of at least one loop-control-instruction-triggered stream of prefetch requests specifying addresses predicted based on a property of at least one instruction program loop body associated with the loop whose presence is indicated by the loop control instruction. By triggering prefetch generation based on detection of the presence of the loop control instruction, prefetch streams can be initialised with much lower prefetch resource than if other methods were used to compare addresses to detect stride patterns, and also the prefetch streams can be activated earlier than with those alternative training methods, since the loop control hints give a shortcut to identifying the presence of, and parameters of, the streams of accesses, compared to trying to learn those access patterns indirectly by comparison of addresses accessed by the processing circuitry 8.

Figure 11:
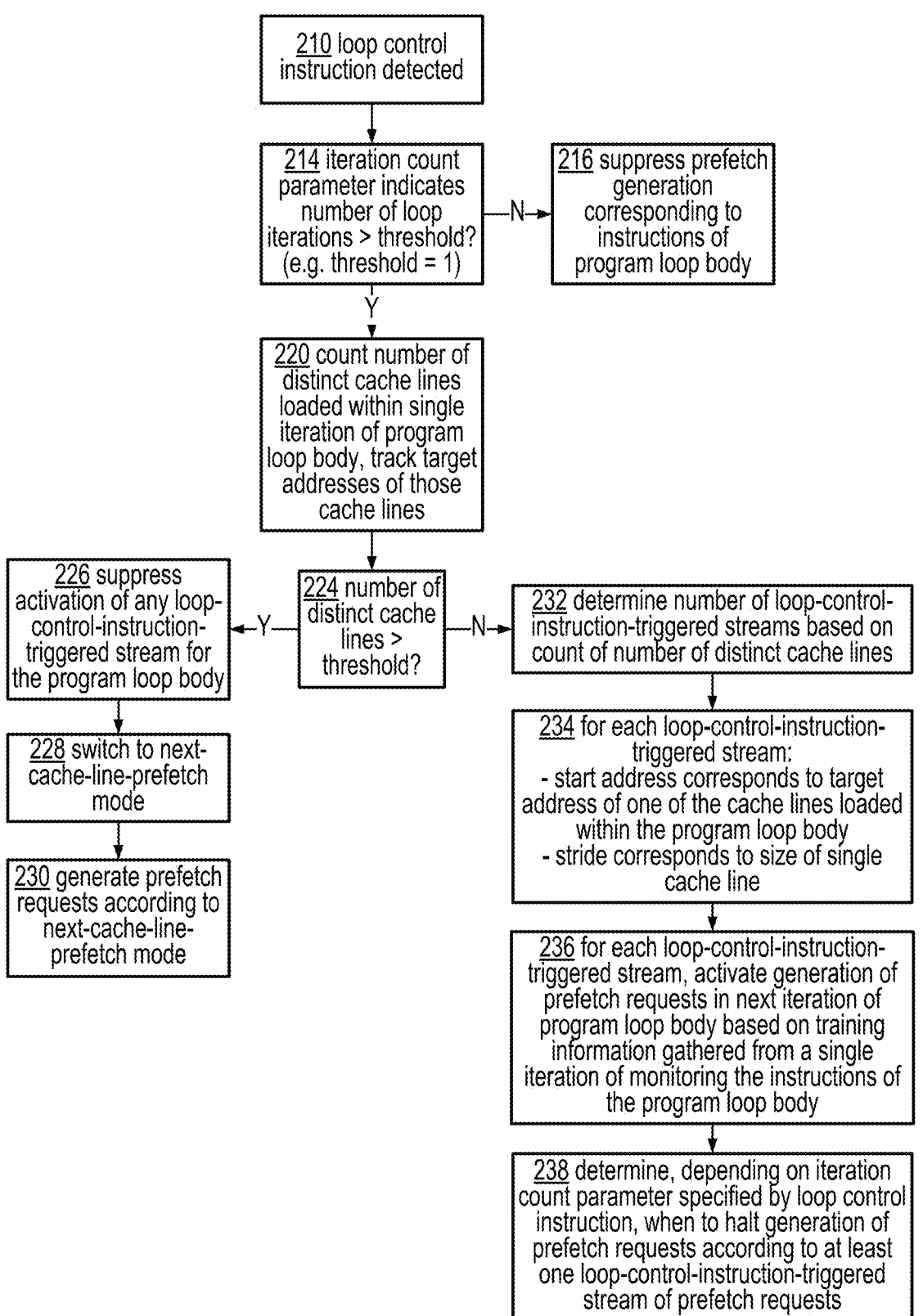
FIG. 11 illustrates steps for controlling the generation of prefetch requests based on information deduced from loop control instructions.

FIG. 11 shows steps indicating in more detail how the prefetcher can activate prefetch streams based on the detection of the loop control instruction. At step 210 the instruction decoder 6 signals to the prefetch circuitry 30 that a loop control instruction has been detected. At step 214, the prefetch circuitry 30 determines whether an iteration count parameter of the loop control instruction indicates that the number of loop iterations to be performed is greater than a threshold number (for example the threshold number could be 1). If the number of loop iterations to be performed is less than or equal to the threshold, then at step 216 the prefetch circuitry 30 suppresses prefetch generation corresponding to instructions of the program loop body, and does not activate any streams of loop control instruction triggered prefetch requests. In some cases the threshold number could be 1, as if there is 0 or 1 loop iteration to be performed, prefetching may not help improve performance as the first iteration of the loop may be needed to detect the addresses of the loads so that prefetching can be activated for addresses predicted to be accessed in subsequent iterations, so if the number of iterations is 0 or 1 then the processing circuitry never executes the second iteration that could benefit from the prefetch stream established based on the first iteration (if any). However, in some examples the threshold number could be set to be greater than one (e.g. 2, 3 or more), depending on the estimated time taken to return prefetched data to the cache 32, which could mean that even if there is more than one loop iteration to be performed, it may only be if the number of loop iterations is greater than the threshold that the prefetched data can be returned timely enough to be in the cache 32 before the corresponding load is executed. Hence, in some examples, it may be useful to restrict the allocation of streams based on the loop control instruction detection to cases where the indicated number of loop iterations is greater than a certain threshold. This avoids wasting prefetch tracking entries of the tracking structure 170 when prefetching is likely not to be beneficial to performance, preserving them for tracking other access patterns unrelated to the loop signalled by the loop control instruction.

If the iteration count is greater than the threshold, then at step 220 the prefetch circuitry 30 counts the number of distinct cache lines loaded within a single iteration of the program loop body, and tracks the target addresses of those cache lines. The instructions which correspond to a single iteration of the program loop body can be detected based on the loop control instruction(s) encountered in the decoded sequence of instructions (e.g. based on the number of load instructions targeting different cache lines that are detected between two successive loop control instructions, or between successive branch points triggered by the loop control circuitry 20 which has been initialised based on parameters of loop control instructions).

At step 224, the prefetch circuitry determines whether the number of distinct cache lines detected as being loaded in the program loop body exceeds a given threshold (the threshold may correspond to the maximum number of streams supported in parallel by the stream tracking circuitry 170). If the number of distinct cache lines is greater than the threshold, then the prefetch circuitry 30 may have insufficient resource to track all the streams being loaded within the loop. For example, if the maximum number of streams supported is 2, the prefetch circuitry 30 may not be able to handle the template 3 example shown above which has 4 independent streams. If the number of distinct cache lines loaded in one loop iteration is greater than the threshold number of streams, it may be desirable not to activate streams of prefetch requests for only some of the streams encountered in the loop, as the overall performance of the loop may be limited based on the slowest performing stream and so speeding up accesses for some of the streams may not benefit performance. Therefore, at step 226 the prefetch circuitry suppresses activation of any loop-control-instruction-triggered stream for the program loop body. The stream tracking resources 170 of the prefetcher 30 can be preserved for tracking other streams of accesses not related to the loop associated with the detected loop control instruction. At step 228, the prefetch circuitry 30 switches to the next-cache-line-prefetch mode, and at step 230 the prefetch circuitry 30 generates prefetch requests according to the next-cache-line-prefetch mode, which as shown in FIG. 7 causes prefetch requests to be generated to addresses that are a certain distance X ahead of the address A of a detected cache miss.

On the other hand, if the number of distinct cache lines detected in one iteration of the program loop body does not exceed the threshold checked at step 224, then at step 232 the prefetch circuitry determines the number of loop-control-instruction-triggered streams of prefetch requests to be activated, based on the count of the number of distinct cache lines loaded in the loop. At step 234, for each of those streams, the prefetch circuitry 30 sets the start address of the stream corresponding to the target address of one of the distinct cache lines detected as being loaded within the program loop body, and sets the stride for the stream to correspond to the size of a single cache line. At step 236, for each loop-control-instruction-triggered stream, the prefetch circuitry 30 activates generation of prefetch request for that the stream in the next iteration of the program loop body encountered after the iteration in which the training information (count of number of loaded cache lines, addresses of those cache lines) was gathered at step 220 based on monitoring the instructions of the program loop body. Hence, only a single iteration of the program loop body needs to be monitored to be able to start generating prefetch requests (rather than needing multiple iterations to allow for stride computation and comparison).

At step 238, the prefetch circuitry 30 determines, depending on the iteration count parameter specified by the loop control instruction (either directly based on the iteration count parameter, or indirectly via the iteration tracking counter maintained by the loop control circuitry 20 which will previously have been initialised based on the iteration count parameter), when to halt generation of prefetch requests according to at least one loop-control-instruction-triggered stream of prefetch requests. Hence, over-prefetching for the streams can be reduced by taking the information given in the iteration count parameter into account to identify when the loop is likely to terminate. Step 238 can be omitted if no instruction specifying an iteration count parameter has been encountered (e.g. because the LS instruction described earlier was omitted for a while loop)—in that case, the prefetching may continue until comparison of addresses of demand accesses identifies that the prefetch predictions are no longer accurate.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 12:
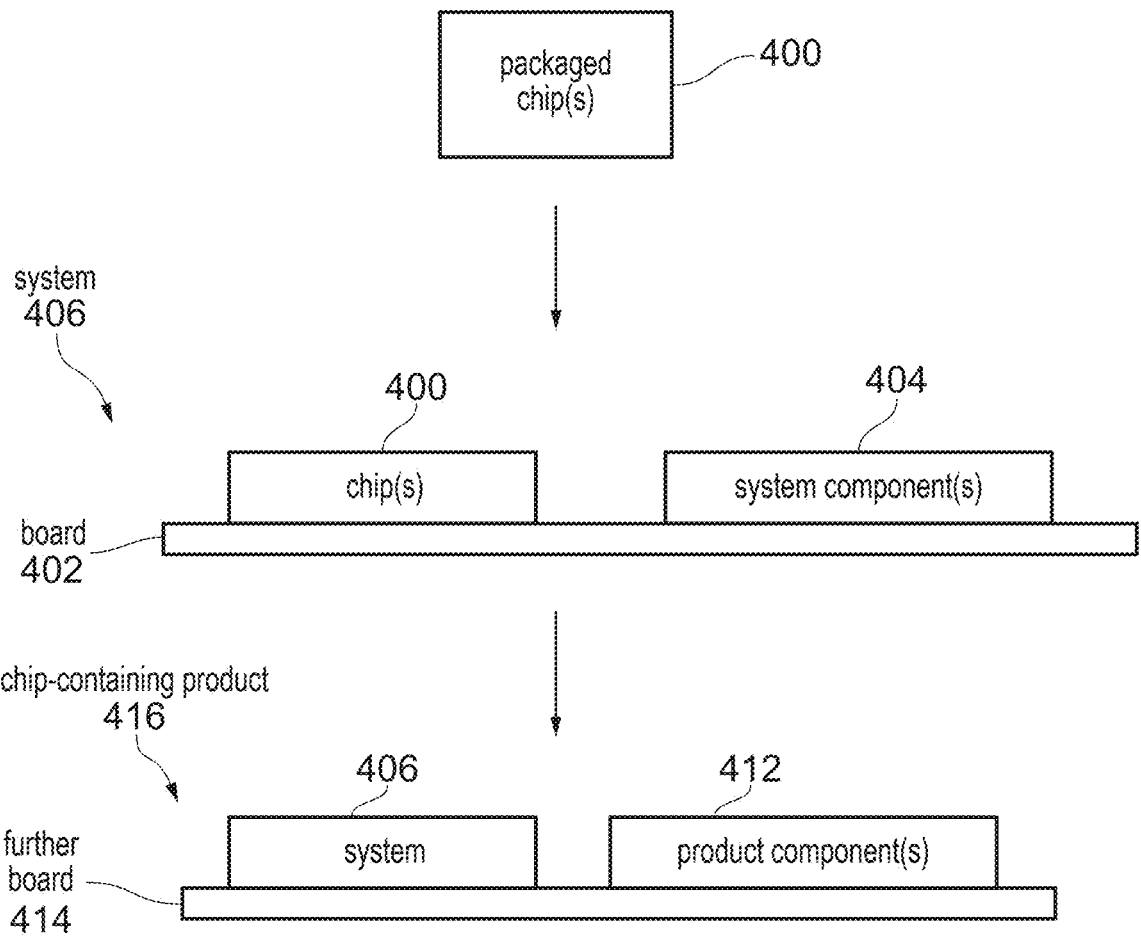
FIG. 12 illustrates a system and a chip-containing product.

As shown in FIG. 12, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:

decoding circuitry to decode instructions defined according to an instruction set architecture, the instruction set architecture supporting a loop control instruction providing an explicit loop presence hint indicating that a sequence of instructions to be executed includes a program loop body to be iterated;

processing circuitry to perform data processing in response to the decoded instructions; and prefetch circuitry to generate a prefetch request, the prefetch request comprising a request for data to be prefetched into a cache corresponding to an address predicted to be accessed by the processing circuitry in future; in which:

the prefetch circuitry is configured to:

determine whether the decoding circuitry has detected the loop control instruction in a sequence of decoded instructions; and in response to determining that the decoding circuitry has detected the loop control instruction, activate generation of at least one loop-control-instruction-triggered stream of prefetch requests specifying addresses predicted based on a property of at least one instruction of the program loop body whose presence is indicated by the loop control instruction.

2. The apparatus according to clause 1, in which the prefetch circuitry is configured to activate generation of a given loop-control-instruction-triggered stream based on training information gathered in a single iteration of the program loop body.

3. The apparatus according to any of clauses 1 and 2, in which each loop-control-instruction-triggered stream of prefetch requests comprises prefetch requests specifying addresses at intervals of a constant stride determined relative to a stream start address, the stream start address depending on a target address of a load instruction detected within the program loop body.

4. The apparatus according to clause 3, in which the constant stride corresponds to a size of a single cache line.

5. The apparatus according to any of clauses 1 to 4, in which the prefetch circuitry is configured to determine how many loop-control-instruction-triggered streams of prefetch requests are to be activated, based on a count of a number of distinct cache lines specified by target addresses of load instructions appearing within a single iteration of the program loop body.

6. The apparatus according to clause 5, in which, in response to detecting that the number of distinct cache lines is greater than a threshold number, the prefetch circuitry is configured to suppress activation of said at least one loop-control-instruction-triggered stream of prefetch requests, and switch to a next-cache-line-prefetch mode in which the prefetch circuitry is configured to trigger, in response to a cache miss detected for a given address, generation of a prefetch request specifying an address that is offset relative to the given address by a predetermined amount.

7. The apparatus according to clause 6, in which the threshold number corresponds to a maximum number of streams of prefetch requests supported to be processed in parallel by the prefetch circuitry.

8. The apparatus according to any of clauses 1 to 7, in which the loop control instruction specifies an iteration count parameter indicative of a number of loop iterations for which the program loop body is to be iterated; and the prefetch circuitry is configured to determine, dependent on the iteration count parameter of the loop control instruction, when to halt generation of the prefetch requests according to said at least one loop-control-instruction-triggered stream of prefetch requests.

9. The apparatus according to clause 8, in which the processing circuitry is configured to initialise, depending on the iteration count parameter, a loop counter for tracking a number of remaining loop iterations of the program loop body; and the prefetch circuitry is configured to halt generation of the prefetch requests according to said at least one loop-control-instruction-triggered stream of prefetch requests, in response to detecting based on the loop counter that a number of remaining loop iterations is less than a threshold number of loop iterations.

10. The apparatus according to clause 8, in which the prefetch circuitry is configured to determine, based on the iteration count parameter and a load data size associated with a given load instruction of the program loop body, a number of prefetch requests to be generated for a given loop-control-instruction-triggered stream of prefetch requests.

11. The apparatus according to any of clauses 8 to 10, in which in response to detecting that the iteration count parameter specified by the loop control instruction indicates that the number of loop iterations is less than or equal to a threshold number of iterations, the prefetch circuitry is configured to suppress activation of the at least one loop-control-instruction-triggered stream of prefetch requests.

12. The apparatus according to any of clauses 1 to 11, in which the loop control instruction comprises a zero-overhead loop control instruction.

13. The apparatus according to any of clauses 1 to 12, in which in response to the loop control instruction, the processing circuitry is configured to set at least one loop control parameter for controlling execution of one or more iterations of the program loop body; and the apparatus comprises loop control circuitry to control, based on the at least one loop control parameter, execution of one or more iterations of the program loop body, the program loop body excluding the loop control instruction itself.

14. The apparatus according to any of clauses 1 to 13, the instruction set architecture supports at least one of the following types of the loop control instruction:

a loop start instruction for execution before a start of the program loop body; and a loop end instruction for execution at an end of at least a first iteration of the program loop body.

15. The apparatus according to any of clauses 1 to 14, in which the loop control instruction comprises a loop start instruction specifying a loop end address and an iteration count parameter indicative of a number of loop iterations for which the program loop body is to be iterated; and in response to determining that the iteration count parameter indicates that the number of loop iterations is zero, the processing circuitry is configured to trigger a branch to the loop end address; and in response to determining that the iteration count parameter indicates that the number of loop iteration is non-zero, the processing circuitry is configured to initialise a loop count value to track a number of remaining loop iterations of the program loop body.

16. The apparatus according to any of clauses 1 to 15, in which the loop control instruction comprises a loop end instruction specifying a loop start address; and in response to the loop end instruction, the processing circuitry is configured to determine based on a loop count value whether a further iteration of the program loop body is required, and in response to determining that a further iteration of the program loop body is required, trigger a branch to the loop body start address.

17. The apparatus according to clause 16, in which, in response to the loop end instruction, the processing circuitry is configured to set at least one loop control parameter to indicate a branch trigger address corresponding to an address of an instruction preceding the loop end instruction; and the apparatus comprises loop control circuitry to trigger a branch to the loop body start address in response to determining, in response to program flow reaching the branch trigger address, that an additional iteration of the program loop body is required.

18. A system comprising:

the apparatus according to any of clauses 1 to 17, implemented in at least one packaged chip;

at least one system component; and a board, wherein the at least one packaged chip and the at least one system component are assembled on the board.

19. A chip-containing product comprising the system of clause 18, wherein the system is assembled on a further board with at least one other product component.

20. A non-transitory computer-readable medium storing computer-readable code for fabrication of an apparatus according to any of clauses 1 to 17.

21. A method comprising: decoding instructions for execution by processing circuitry according to an instruction set architecture, the instruction set architecture supporting a loop control instruction providing an explicit loop presence hint indicating that a sequence of instructions to be executed includes a program loop body to be iterated; determining whether the decoding has detected the loop control instruction; and in response to determining that the decoding circuitry has detected the loop control instruction, activating generation of at least one loop-control-instruction-triggered stream of prefetch requests specifying addresses predicted based on a property of at least one instruction of the program loop body whose presence is indicated by the loop control instruction, each prefetch request comprising a request for data to be prefetched into a cache corresponding to an address predicted to be accessed by processing circuitry in future.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

decoding circuitry configured to decode instructions defined according to an instruction set architecture, the instruction set architecture supporting a loop control instruction providing an explicit loop presence hint indicating that a sequence of instructions to be executed includes a program loop body to be iterated;

processing circuitry configured to perform data processing in response to the decoded instructions; and prefetch circuitry configured to generate a prefetch request, the prefetch request comprising a request for data to be prefetched into a cache corresponding to an address predicted to be accessed by the processing circuitry in future; in which:

the prefetch circuitry is configured to:

determine whether the decoding circuitry has detected the loop control instruction in a sequence of the decoded instructions;

in response to determining that the decoding circuitry has detected the loop control instruction, activate generation of at least one loop-control-instruction-triggered stream of prefetch requests specifying addresses predicted based on a property of at least one instruction of the program loop body whose presence is indicated by the loop control instruction;

determine how many loop-control-instruction-triggered streams of prefetch requests are to be activated, based on a count of a number of distinct cache lines specified by target addresses of load instructions appearing within a single iteration of the program loop body; and in response to detecting that the number of distinct cache lines is greater than a threshold number, suppress activation of said at least one loop-control-instruction-triggered stream of prefetch requests, and switch to a next-cache-line-prefetch mode to trigger, in response to a cache miss detected for a given address, generation of a prefetch request specifying an address that is offset relative to the given address by a predetermined amount.

2. The apparatus according to claim 1, in which the prefetch circuitry is configured to activate generation of a given loop-control-instruction-triggered stream based on training information gathered in a single iteration of the program loop body.

3. The apparatus according to claim 1, in which each loop-control-instruction-triggered stream of prefetch requests comprises prefetch requests specifying addresses at intervals of a constant stride determined relative to a stream start address, the stream start address depending on a target address of a load instruction detected within the program loop body.

4. The apparatus according to claim 3, in which the constant stride corresponds to a size of a single cache line.

5. The apparatus according to claim 1, in which the threshold number corresponds to a maximum number of streams of prefetch requests supported to be processed in parallel by the prefetch circuitry.

6. The apparatus according to claim 1, in which the loop control instruction specifies an iteration count parameter indicative of a number of loop iterations for which the program loop body is to be iterated; and the prefetch circuitry is configured to determine, dependent on the iteration count parameter of the loop control instruction, when to halt prefetch request generation according to the at least one loop-control-instruction-triggered stream of prefetch requests.

7. The apparatus according to claim 6, in which the processing circuitry is configured to initialise, depending on the iteration count parameter, a loop counter for tracking a number of remaining loop iterations of the program loop body; and the prefetch circuitry is configured to halt prefetch request generation according to the at least one loop-control-instruction-triggered stream of prefetch requests, in response to detecting based on the loop counter that the number of remaining loop iterations is less than a threshold number of loop iterations.

8. The apparatus according to claim 6, in which the prefetch circuitry is configured to determine, based on the iteration count parameter and a load data size associated with a given load instruction of the program loop body, a number of prefetch requests to be generated for a given loop-control-instruction-triggered stream of prefetch requests.

9. The apparatus according to claim 6, in which in response to detecting that the iteration count parameter specified by the loop control instruction indicates that the number of loop iterations is less than or equal to a threshold number of iterations, the prefetch circuitry is configured to suppress activation of the at least one loop-control-instruction-triggered stream of prefetch requests.

10. The apparatus according to claim 1, in which the loop control instruction comprises a zero-overhead loop control instruction.

11. The apparatus according to claim 1, in which in response to the loop control instruction, the processing circuitry is configured to set at least one loop control parameter for controlling execution of one or more iterations of the program loop body; and the apparatus comprises loop control circuitry to control, based on the at least one loop control parameter, execution of the one or more iterations of the program loop body, the program loop body excluding the loop control instruction itself.

12. The apparatus according to claim 1, the instruction set architecture supports at least one of the following types of the loop control instruction:

a loop start instruction for execution before a start of the program loop body; and a loop end instruction for execution at an end of at least a first iteration of the program loop body.

13. The apparatus according to claim 1, in which the loop control instruction comprises a loop start instruction specifying a loop end address and an iteration count parameter indicative of a number of loop iterations for which the program loop body is to be iterated; and in response to determining that the iteration count parameter indicates that the number of loop iterations is zero, the processing circuitry is configured to trigger a branch to the loop end address; and in response to determining that the iteration count parameter indicates that the number of loop iteration is non-zero, the processing circuitry is configured to initialise a loop count value to track a number of remaining loop iterations of the program loop body.

14. The apparatus according to claim 1, in which the loop control instruction comprises a loop end instruction specifying a loop start address; and in response to the loop end instruction, the processing circuitry is configured to determine based on a loop count value whether a further iteration of the program loop body is required, and in response to determining that a further iteration of the program loop body is required, trigger a branch to the loop body start address.

15. A system comprising:

the apparatus according to claim 1, implemented in at least one packaged chip;

at least one system component; and a board, wherein the at least one packaged chip and the at least one system component are assembled on the board.

16. A chip-containing product comprising the system of claim 15, wherein the system is assembled on a further board with at least one other product component.

17. A non-transitory computer-readable medium storing computer-readable code for fabrication of an apparatus comprising:

decoding circuitry to decode instructions defined according to an instruction set architecture, the instruction set architecture supporting a loop control instruction providing an explicit loop presence hint indicating that a sequence of instructions to be executed includes a program loop body to be iterated;

processing circuitry to perform data processing in response to the decoded instructions; and prefetch circuitry to generate a prefetch request, the prefetch request comprising a request for data to be prefetched into a cache corresponding to an address predicted to be accessed by the processing circuitry in future; in which:

the prefetch circuitry is configured to:

determine whether the decoding circuitry has detected the loop control instruction in a sequence of the decoded instructions;

in response to determining that the decoding circuitry has detected the loop control instruction, activate generation of at least one loop-control-instruction-triggered stream of prefetch requests specifying addresses predicted based on a property of at least one instruction of the program loop body whose presence is indicated by the loop control instruction;

determine how many loop-control-instruction-triggered streams of prefetch requests are to be activated, based on a count of a number of distinct cache lines specified by target addresses of load instructions appearing within a single iteration of the program loop body; and in response to detecting that the number of distinct cache lines is greater than a threshold number, suppress activation of said at least one loop-control-instruction-triggered stream of prefetch requests, and switch to a next-cache-line-prefetch mode to trigger, in response to a cache miss detected for a given address, generation of a prefetch request specifying an address that is offset relative to the given address by a predetermined amount.

\* \* \* \* \*